(12) United States Patent
Auyang et al.

(10) Patent No.: US 12,453,394 B2
(45) Date of Patent: *Oct. 28, 2025

(54) ARTICULATED CUSHIONING ARTICLE WITH TENSILE COMPONENT AND METHOD OF MANUFACTURING A CUSHIONING ARTICLE

(71) Applicant: NIKE, Inc., Beaverton, OR (US)

(72) Inventors: Arick Auyang, Portland, OR (US); Page J. Bailey, Portland, OR (US); Jeremy L. Connell, Portland, OR (US); Derek Houng, Portland, OR (US); Jason R. Meeker, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,793

(22) Filed: Jul. 15, 2024

(65) Prior Publication Data
US 2024/0365926 A1 Nov. 7, 2024

Related U.S. Application Data

(60) Continuation of application No. 18/092,674, filed on Jan. 3, 2023, now Pat. No. 12,064,007, which is a continuation of application No. 17/095,088, filed on Nov. 11, 2020, now Pat. No. 11,633,011, which is a division of application No. 15/982,731, filed on May 17, 2018, now Pat. No. 10,863,792.

(Continued)

(51) Int. Cl.
*A43B 13/20* (2006.01)
*A43B 9/12* (2006.01)
*A43B 13/04* (2006.01)
*A43B 13/18* (2006.01)

(52) U.S. Cl.
CPC ............... *A43B 13/20* (2013.01); *A43B 9/12* (2013.01); *A43B 13/04* (2013.01); *A43B 13/186* (2013.01)

(58) Field of Classification Search
CPC ....... A43B 13/20; A43B 13/04; A43B 13/186; A43B 13/142; A43B 9/12
See application file for complete search history.

(56) References Cited

U.S. PATENT DOCUMENTS 7,588,654 B2 * 9/2009 Schindler ............... A43B 13/20
36/35 B
7,591,919 B2 * 9/2009 Schindler ............. A43B 13/125
36/35 B (Continued)

*Primary Examiner* — Bao-Thieu L Nguyen
(74) *Attorney, Agent, or Firm* — Quinn IP Law

(57) ABSTRACT

A cushioning article includes a bladder enclosing an interior cavity and retaining a gas in the interior cavity. A tensile component is disposed in the interior cavity and includes tensile layers and a plurality of tethers connecting the tensile layers. The tensile layers are connected to an inner surface of the bladder such that the tethers span across the interior cavity. The bladder has an inwardly-protruding bond that joins an inner surface of the bladder to the tensile component, protrudes inward into the interior cavity, and partially traverses the plurality of tethers such that the bladder is narrowed at the inwardly protruding bond and the gas in the interior cavity fluidly communicates across the inwardly-protruding bond. A method of manufacturing a cushioning article is disclosed.

19 Claims, 13 Drawing Sheets

Related U.S. Application Data

(60) Provisional application No. 62/508,035, filed on May 18, 2017.

(56) References Cited

U.S. PATENT DOCUMENTS

| | | | |
|---|---|---|---|
| 8,464,439 B2* | 6/2013 | Monfils | A43B 13/20 36/35 B |
| 9,730,487 B2* | 8/2017 | Davison | A43B 13/12 |
| 9,801,428 B2* | 10/2017 | Taylor | A43B 13/206 |
| 9,894,959 B2* | 2/2018 | Taylor | A43B 13/203 |
| 10,863,792 B2* | 12/2020 | Auyang | A43B 13/186 |
| 11,633,011 B2* | 4/2023 | Auyang | A43B 13/20 36/29 |
| 2006/0021251 A1 | 2/2006 | Swigart et al. | |
| 2007/0251122 A1 | 11/2007 | Snow et al. | |
| 2011/0277347 A1* | 11/2011 | Monfils | A43B 13/20 36/29 |
| 2011/0277916 A1* | 11/2011 | Beye | B29D 35/122 156/145 |
| 2015/0113829 A1* | 4/2015 | Kodad | A43B 13/141 383/105 |
| 2016/0081428 A1* | 3/2016 | Swigart | A43B 13/20 36/29 |
| 2016/0143392 A1* | 5/2016 | Peyton | B32B 3/06 428/76 |
| 2017/0086532 A1 | 3/2017 | Youngs | |
| 2017/0347747 A1 | 12/2017 | Groeneweg et al. | |
| 2018/0064207 A1* | 3/2018 | Hurd | A43B 13/188 |
| 2018/0332925 A1* | 11/2018 | Bailey | B32B 7/05 |

\* cited by examiner

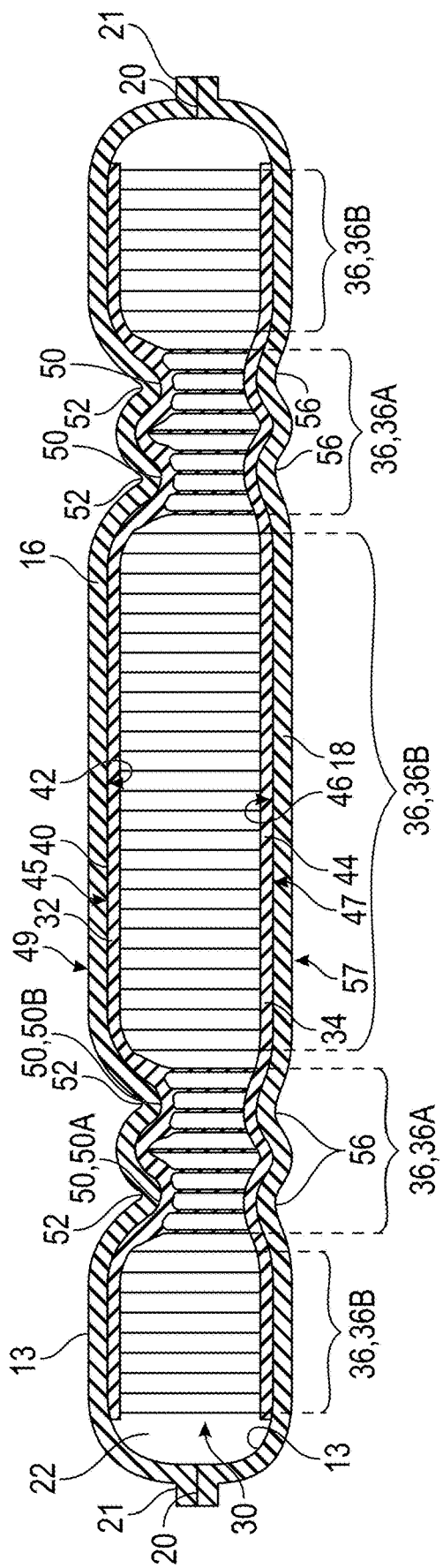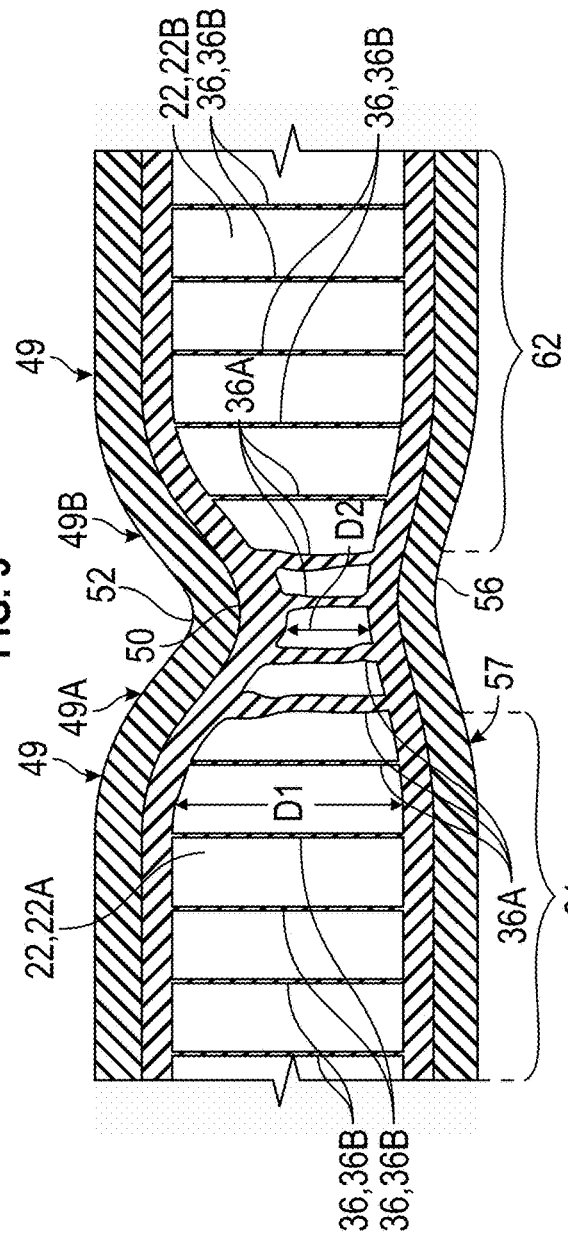

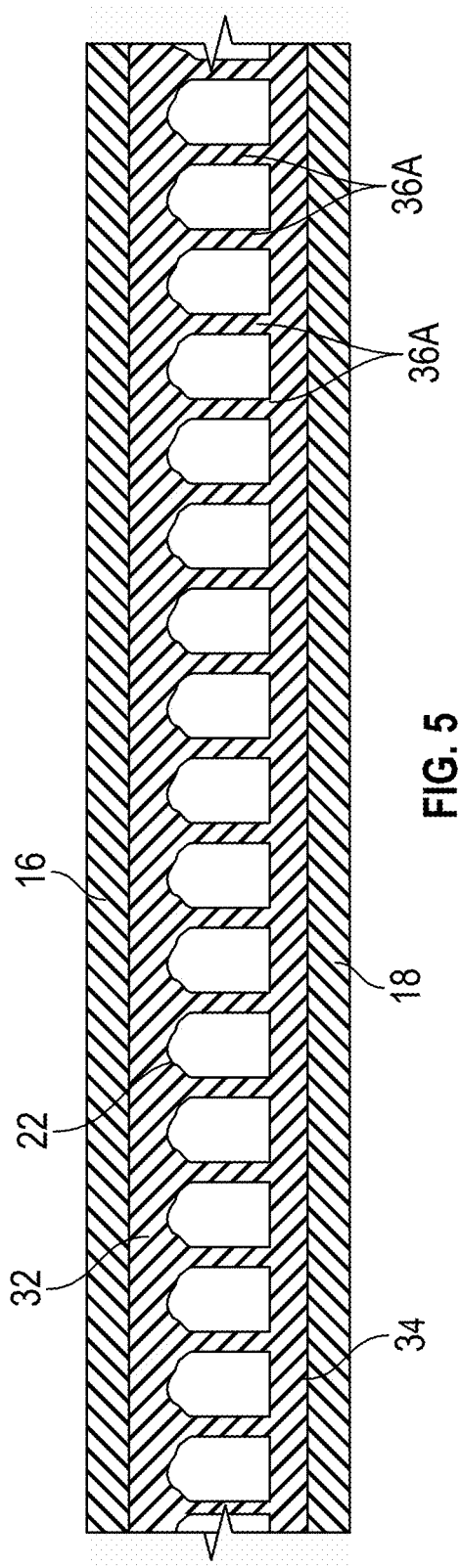
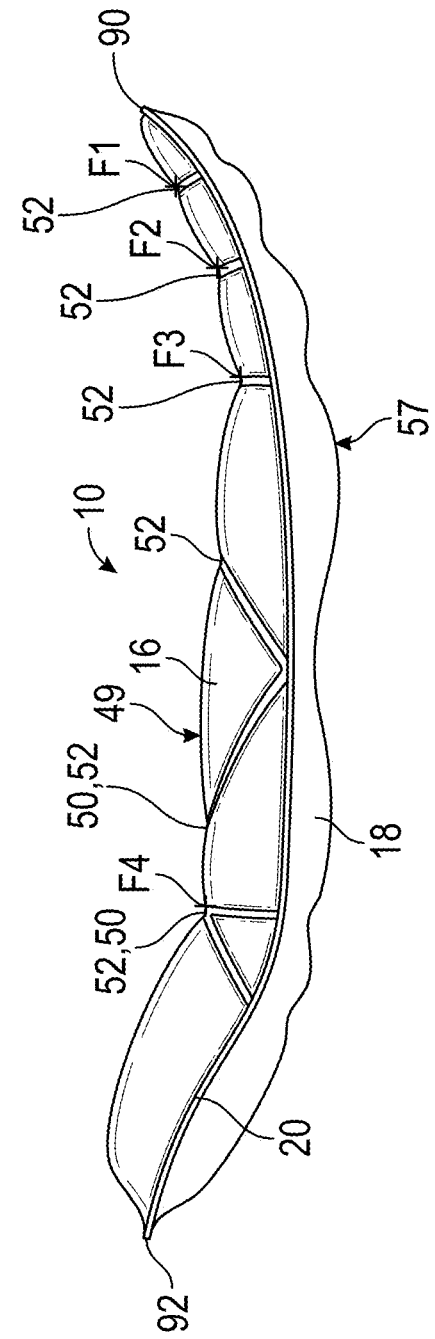
FIG. 5
FIG. 6

ARTICULATED CUSHIONING ARTICLE WITH TENSILE COMPONENT AND METHOD OF MANUFACTURING A CUSHIONING ARTICLE

CROSS-REFERENCE TO RELATED APPLICATIONS

This application is a continuation of U.S. application Ser. No. 18/092,674, filed Jan. 3, 2023, which is a continuation of U.S. application Ser. No. 17/095,088 filed Nov. 11, 2020, now U.S. Pat. No. 11,633,011, issued Apr. 25, 2023, which is a continuation of U.S. application Ser. No. 15/982,731 filed May 17, 2018, now U.S. Pat. No. 10,863,792, issued Dec. 15, 2020, which claims the benefit of priority to U.S. Provisional Application No. 62/508,035 filed May 18, 2017, and each of which is hereby incorporated by reference in its entirety.

TECHNICAL FIELD

The present teachings generally include a cushioning article having an articulated tensile component, and a method of manufacturing the cushioning article with an inwardly-protruding bond.

BACKGROUND

A cushioning article, such as a sole component of an article of footwear, is typically configured to provide cushioning, motion control, and/or resilience. Some cushioning articles utilize a sealed interior cavity filled with a gas that resiliently reacts a compressive load. A tensile component may be disposed in the interior cavity, and may limit the outward expansion of the cushioning article.

BRIEF DESCRIPTION OF THE DRAWINGS

FIG. 3 is a schematic illustration in cross-sectional view of the cushioning article of FIG. 1, taken at lines 3-3 in FIG. 1.

FIG. 4 is a schematic illustration in cross-sectional view of the cushioning article of FIG. 1, taken at lines 4-4 in FIG. 1.

FIG. 5 is a schematic illustration in cross-sectional view of the cushioning article of FIG. 1, taken at lines 5-5 in FIG. 1.

FIG. 6 is a schematic illustration in medial side view of the cushioning article of FIG. 1.

DESCRIPTION

Figure 1:
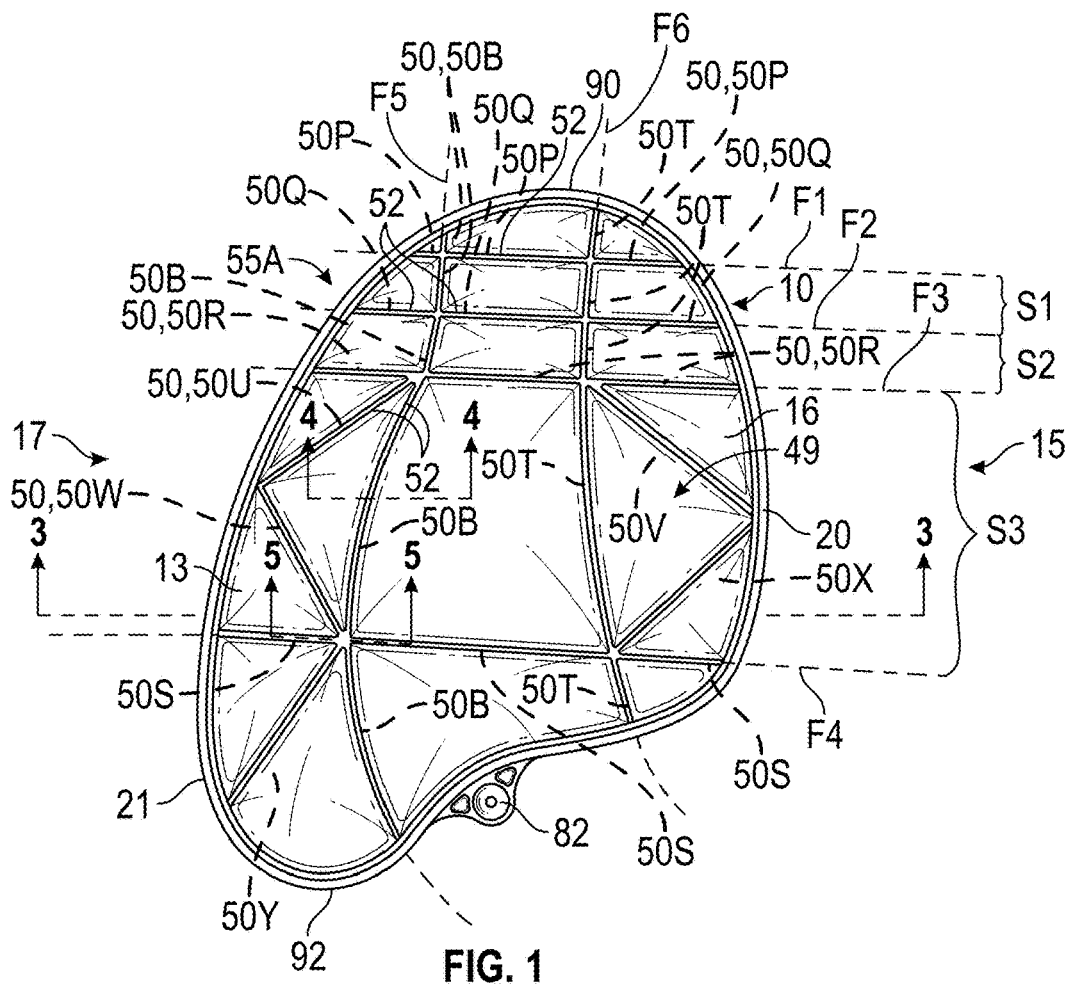
FIG. 1 is a schematic illustration in plan view of a cushioning article in accordance with the present teachings.
Figure 2:
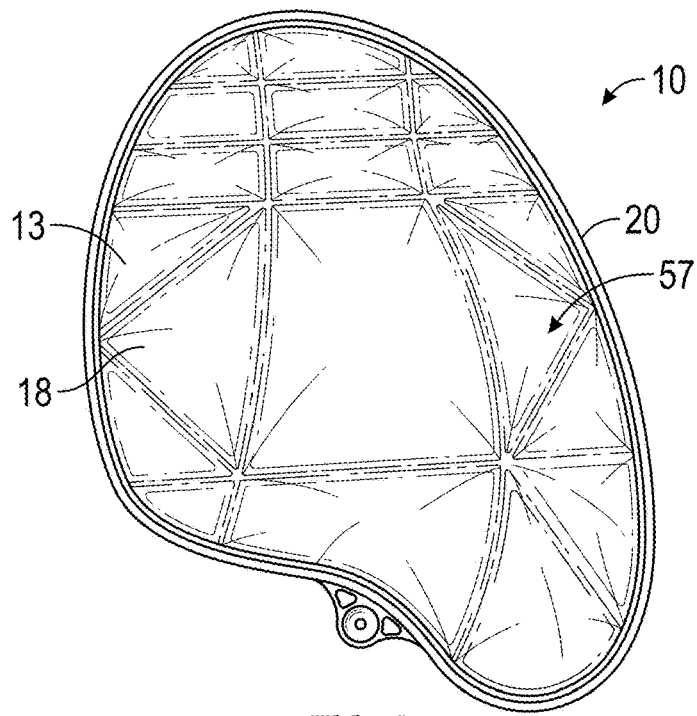
FIG. 2 is a schematic illustration in bottom view of the cushioning article of FIG. 1.

A cushioning article comprises a bladder enclosing an interior cavity and retaining a gas in the interior cavity. The cushioning article further comprises a tensile component disposed in the interior cavity. The tensile component includes tensile layers and a plurality of tethers connecting the tensile layers. The tensile layers are connected to an inner surface of the bladder such that the tethers span across the interior cavity. The bladder has an inwardly-protruding bond that joins an inner surface of the bladder to the tensile component, protrudes inward into the interior cavity, and partially traverses the plurality of tethers such that the bladder is narrowed at the inwardly protruding bond and the gas in the interior cavity fluidly communicates across the inwardly-protruding bond. Stated differently, the inwardly-protruding bond is directly outward of some of the tethers. The inwardly-protruding bond is spaced apart from the second polymeric sheet such that the interior cavity is narrowed at the inwardly-protruding bond and the gas in the interior cavity is able to fluidly communicate across the inwardly-protruding bond.

In one or more embodiments, a portion of the interior cavity at a first side of the inwardly-protruding bond is in fluid communication with a portion of the interior cavity at a second side of the inwardly-protruding bond, the second side opposite of the first side. The gas in the interior cavity can thus be displaced across the inwardly-protruding bond, such as during a foot strike or foot roll of an article of footwear when the cushioning article is included in a sole structure.

In one or more embodiments, an inflation pressure of the gas in the interior cavity is sufficient to tension the plurality of tethers, and the inwardly-protruding bond defines a groove at an outer surface of the bladder such that the cushioning article is divided into a first article portion on one side of the groove and a second article portion on the other side of the groove. The groove may function as a flex groove at which the cushioning article articulates. Accordingly, the consistency and responsiveness of tethers in returning the interior cavity to its original shape following a dynamic compressive load is combined with the flexibility of an articulated cushioning component, with articulation occurring in alignment with the tethers traversed by the inwardly-protruding bond.

In one or more embodiments, the tensile layers include a first tensile layer spaced apart from a second tensile layer by a first distance at a location adjacent to the inwardly-protruding bond, and with the inwardly-protruding bond spaced apart from the second tensile layer by a second distance. The second distance may be between 50 percent and 80 percent of the first distance. Narrowing of the interior cavity by this ratio may provide an optimal range of articulation that contributes to flexibility of the cushioning article.

Because the inwardly-protruding bond at least partially traverses the plurality of tethers, in one or more embodiments, the plurality of tethers includes tethers aligned with the inwardly-protruding bond and tethers displaced from the inwardly-protruding bond. The tethers aligned with the inwardly-protruding bond are shorter, thicker, or both shorter and thicker than the tethers displaced from the inwardly-protruding bond. The tethers are originally all of the same length and width prior to manufacturing the cushioning article and establishing the inwardly-protruding bond. The deformation of the tethers that occurs during manufacturing at the inwardly-protruding bond contributes to the articulation and flexibility of the cushioning article.

In one or more embodiments, the bladder comprises a first polymeric sheet and a second polymeric sheet bonded to one another at a peripheral flange and enclosing the interior cavity. The tensile layers include a first tensile layer connected to the first polymeric sheet and a second tensile layer connected to the second polymeric sheet. The inwardly-protruding bond is spaced apart from the second polymeric sheet. The second polymeric sheet may be recessed inward toward the inwardly-protruding bond, across from the groove, when the interior cavity is inflated due to the tension of the tethers. Due to the groove, the first article portion is articulated relative to the second article portion along the groove. Accordingly, the outer surface of the first polymeric sheet at a first side of the inwardly-protruding bond may be non-planar with the outer surface of the first polymeric sheet at a second side of the inwardly-protruding bond, with the second side opposite of the first side.

In one or more embodiments, the inwardly-protruding bond is a first inwardly-protruding bond, and the cushioning article further includes a second inwardly-protruding bond that joins the first polymeric sheet to the first tensile layer and protrudes inward from the first polymeric sheet toward the second polymeric sheet and partially traverses the tensile component. The second inwardly-protruding bond intersects the first inwardly-protruding bond and is spaced apart from the second polymeric sheet such that the interior cavity is narrowed at the second inwardly-protruding bond and the gas in the interior cavity fluidly communicates across the second inwardly-protruding bond.

A first surface bond may join an inner surface of the first polymeric sheet to the first tensile layer, and a second surface bond may join an inner surface of the second polymeric sheet to the second tensile layer opposite the first tensile layer. The inwardly-protruding bond protrudes inward from the first polymeric sheet toward the second polymeric sheet farther than the first surface bond.

In one or more embodiments, the cushioning article is a sole component for an article of footwear, and the inwardly-protruding bond establishes a flexion axis of the sole component. Accordingly, the cushioning component may be articulated at the inwardly-protruding bond, and the flexion axes may be aligned with desired flexion regions of a foot, for example, such as the metatarsal-phalangeal joints.

The cushioning article may include multiple inwardly-protruding bonds arranged in a symmetrical manner, which is beneficial for enabling the use of identically-configured cushioning articles in both right foot and left foot articles of footwear with the bonds (and, therefore, the flex grooves) at a proximal side of the bladder in both instances. For example, the inwardly-protruding bond may be one of a plurality of inwardly-protruding bonds protruding inward from a proximal side of the bladder that are arranged in a symmetrical pattern about an axis of symmetry of the bladder. The plurality of inwardly-protruding bonds may include a first set of bonds and a second set of bonds spaced apart from one another and having parallel segments. The first set and the second set establish articulation axes when the cushioning article bends along an axis that is disposed at a first angle counterclockwise from the axis of symmetry. The plurality of inwardly-protruding bonds may further include a third set of bonds and a fourth set of bonds spaced apart from one another and having parallel segments. The third set and the fourth set establish articulation when the cushioning article bends along an axis that is disposed at the first angle clockwise from the axis of symmetry.

In one or more embodiments, the plurality of inwardly-protruding bonds may include a first central bond extending across the axis of symmetry, a pair of symmetrical forward-angled bonds extending from a first end and a second end of the first central bond, and a pair of symmetrical rearward-angled bonds extending from the first end and the second end of the first central bond. The plurality of inwardly-protruding bonds may further include a second central bond extending across the axis of symmetry and spaced from the first central bond, a pair of symmetrical forward-angled bonds extending from a first end and a second end of the second central bond, and a pair of symmetrical rearward-angled bonds extending from the first end and the second end of the second central bond.

The cushioning article may articulate at first and second flexion axes when the cushioning article bends along an axis disposed at the first angle counterclockwise from the axis of symmetry, and may articulate at third and fourth flexion axes when the cushioning article bends along an axis disposed at the first angle clockwise from the axis of symmetry. The first and second flexion axes extend along the first central bond and the second central bond, respectively, the forward-angled bonds extend from the first ends of the first and second central bonds, and the rearward-angled bonds extend from the second ends of the first and second central bonds. The third and fourth flexion axes extend along the first central bond and the second central bond, respectively, the forward-angled bonds extending from the second ends of the first and second central bonds, and the rearward-angled bonds extending from the first ends of the first and second central bonds.

A method of manufacturing a cushioning article comprises conforming a first polymeric sheet and a second polymeric sheet to components of a mold. For example, conforming the first polymeric sheet and the second polymeric sheet to components of the mold may be by vacuum, compression, or both. Conforming the first and second polymeric sheets in this manner depresses the first polymeric sheet toward the second polymeric sheet at one or more protrusions of one of the components of the mold. A tensile component is disposed between the first polymeric sheet and the second polymeric sheet. The tensile component includes a first tensile layer positioned adjacent the first polymeric sheet, a second tensile layer positioned adjacent the second polymeric sheet, and a plurality of tethers connecting the first tensile layer to the second tensile layer. The protrusion may be directly outward of the plurality of tethers. Conforming the first and second polymeric sheets according to the method produces an inwardly-protruding bond at the protrusion that joins the first polymeric sheet and the first tensile layer and partially traverses the plurality of tethers. The inwardly-protruding bond protrudes toward the second polymeric sheet but is spaced apart from the second tensile layer and the second polymeric sheet.

In one or more embodiments, the method comprises thermally bonding the first tensile layer to the first polymeric sheet and the second tensile layer to the second polymeric sheet opposite the first tensile layer. The thermal bonding may include at least one of heating the first polymeric sheet and the second polymeric sheet prior to disposing the first polymeric sheet and the second polymeric sheet in the mold cavity, radio frequency welding, or heating the mold.

In one or more embodiments, the method may further comprise bonding the first polymeric sheet to the second polymeric sheet at a peripheral bond such that the first polymeric sheet and the second polymeric sheet define a bladder at least partially enclosing an interior cavity containing the tensile component. The plurality of tethers span across the interior cavity from the first tensile layer to the second tensile layer, the inwardly-protruding bond protrudes inward, and the interior cavity is narrowed at the inwardly-protruding bond.

In one or more embodiments, the method may further comprise inflating and sealing the interior cavity. Inflating the interior cavity tensions the plurality of tethers and creates a groove in an outer surface of the first polymeric sheet at the inwardly-protruding bond at which the cushioning article articulates. In one or more embodiments, the cushioning article is a sole component for an article of footwear and the groove establishes a flexion axis of the sole component.

In one or more embodiments, the inwardly-protruding bond is one of a plurality of inwardly-protruding bonds on a proximal side of the cushioning article arranged in a symmetrical pattern about an axis of symmetry of the bladder. The method further includes securing the cushioning article (referred to as a first cushioning article) to a first sole structure configured for a right foot with the axis of symmetry of the first cushioning article rotated at a first angle in a direction that is either clockwise or counterclockwise relative to a longitudinal axis of the first sole structure, and securing an identically-configured second cushioning article to a second sole structure configured for a left foot with the axis of symmetry of the second cushioning article rotated at the first angle in a direction that is an opposite one of clockwise or counterclockwise than the first cushioning article relative to a longitudinal axis of the second sole structure. The first and second sole structures are mirror images of one another. In this arrangement, one set of the flexion axes will be correctly aligned with the joints of the right foot, and another set of the flexion axes will be correctly aligned with the joints of the left foot. Accordingly, the symmetrical pattern of the plurality of inwardly-protruding bonds is specifically designed to allow identical cushioning components to be used in both sole structures having right foot configurations and sole structures having left foot configurations.

In one or more embodiments, the components of the mold include a first mold portion and a second mold portion, at least one of the first mold portion and the second mold portion is translatable relative to the other of the first mold portion and the second mold portion between an open position and a closed position. Bonding the first polymeric sheet and the second polymeric sheet at the peripheral bond includes compressing the first polymeric sheet and the second polymeric sheet between the first mold portion and the second mold portion in the closed position.

In one or more embodiments of the method, prior to conforming the first polymeric sheet and the second polymeric sheet to components of the mold, the method may comprise securing a mold insert to a first mold portion of the mold. The mold component having the protrusion may be the mold insert. This enables the bond pattern of the cushioning articles manufactured according to the method to be easily changed by changing the mold insert to a different mold insert that has a different pattern of protrusions. For example, in one or more embodiments, the mold insert is a first mold insert, the cushioning article is a first cushioning article, and the method further comprises manufacturing a second cushioning article by removing the first mold insert from the first mold portion, and securing a second mold insert having a second protrusion to the first mold portion, wherein the second protrusion is shaped or dimensioned differently than the first protrusion. A subsequent first polymeric sheet and a subsequent second polymeric sheet are then conformed to the second mold insert and to another one of the mold components, respectively, with a subsequent tensile component between the subsequent first polymeric sheet and the subsequent second polymeric sheet. This conforming of the subsequent first polymeric sheet and the subsequent second polymeric sheet depresses the subsequent first polymeric sheet toward the subsequent second polymeric sheet at the second protrusion, with the second protrusion directly outward of the subsequent tensile component. A second inwardly-protruding bond is thereby produced at the second protrusion, and partially traverses the subsequent tensile component. The mold thus provides the second cushioning article with a different bond pattern than the first cushioning article due to the second mold insert.

The above features and advantages and other features and advantages of the present teachings are readily apparent from the following detailed description of the modes for carrying out the present teachings when taken in connection with the accompanying drawings.

Figure 19:
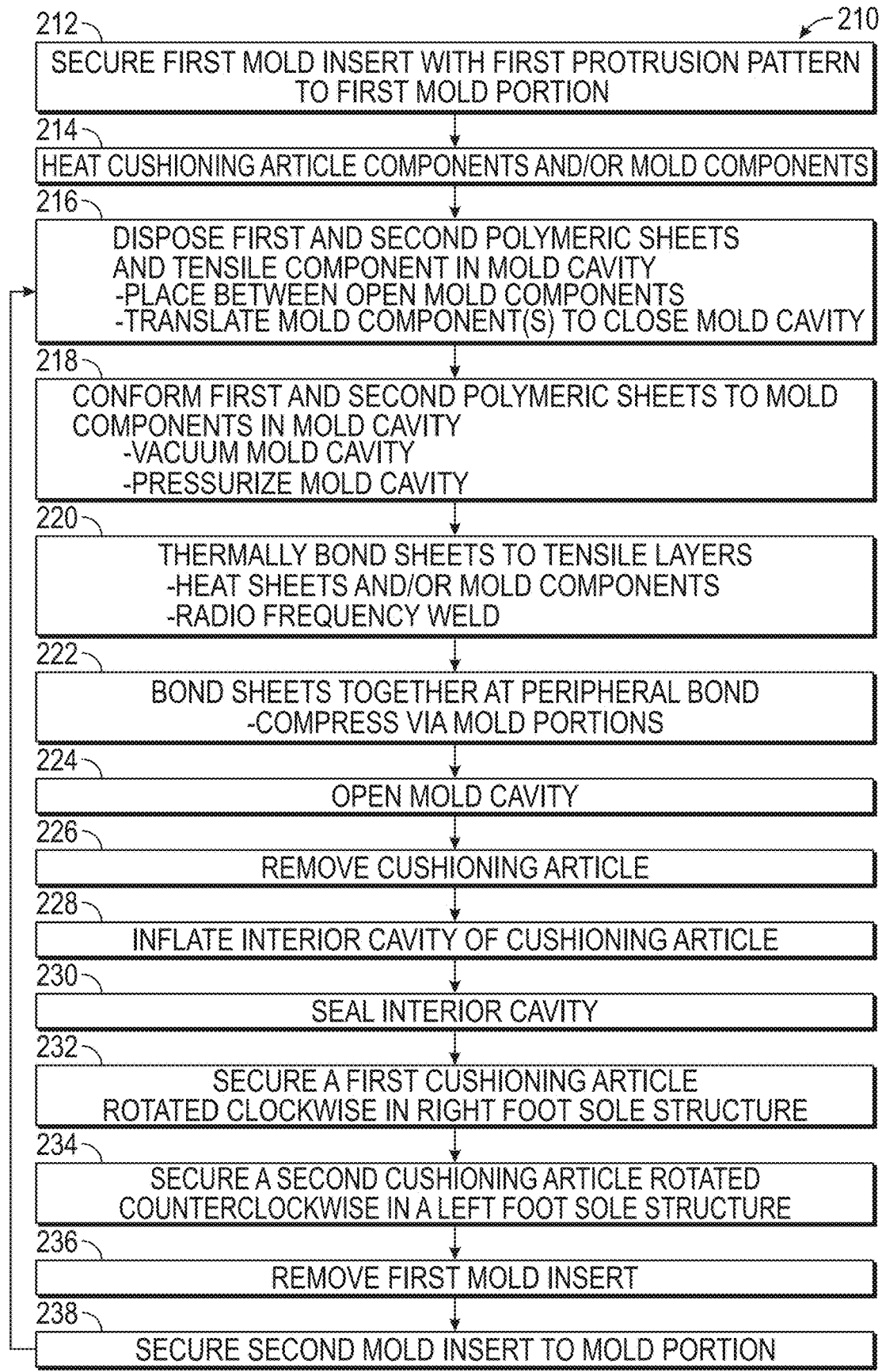
FIG. 19 is a flow chart of a method of manufacturing a cushioning article.

Referring to the drawings, wherein like reference numbers refer to like components throughout the views, FIG. 1 shows a cushioning article 10 that may be manufactured according to a method 210 of FIG. 19 and has features that provide a desirable combination of cushioning and flexibility. The cushioning article 10 is shown and described as a cushioning article used in a sole structure 12 of an article of footwear 14, shown in FIG. 7. For example, the cushioning article 10 is shown at least partially encased in a foam sole layer 11, and together the cushioning article 10 and sole layer 11 serve as a midsole of the sole structure 12. An outsole, an insole, and other sole components may also be included in the sole structure 12. The cushioning article 10 is thus a sole component. However, the cushioning article 10, the cushioning article 110 discussed herein, or other cushioning articles manufactured according to the method 210 may be used in other articles, such as athletic apparel, sports equipment, furniture, and floor mats. For example, the cushioning article 10 or 110 may be for a backpack strap, a helmet cushion, a shin guard, a baseball glove, a seat cushion, or a floor mat.

The cushioning article 10 includes a bladder 13 formed from a first polymeric sheet 16 and a second polymeric sheet 18 bonded to one another at a peripheral bond 20 located along a peripheral flange 21 to enclose an interior cavity 22. When the sheets 16, 18 are bonded together at the peripheral bond 20 and any inflation port is sealed, the bladder 13 retains a fluid in the interior cavity 22. As used herein, a "fluid" filling the interior cavity 22 may be a gas, such as air, nitrogen, another gas, or a combination thereof. The first and second polymeric sheets 16, 18 can be a variety of polymeric materials that can resiliently retain a fluid such as nitrogen, air, or another gas. Examples of polymeric materials for the first and second polymeric sheets 16, 18 include thermoplastic urethane, polyurethane, polyester, polyester polyurethane, and polyether polyurethane. Moreover, the first and second polymeric sheets 16, 18 can each be formed of layers of different materials including polymeric materials. In one embodiment, each of the first and second polymeric sheets 16, 18 is formed from thin films having one or more thermoplastic polyurethane layers with one or more barrier layers of a copolymer of ethylene and vinyl alcohol (EVOH) that is impermeable to the pressurized fluid contained therein such as a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. Additional suitable materials for the first and second polymeric sheets 16, 18 are disclosed in U.S. Pat. Nos. 4,183,156 and 4,219,945 to Rudy which are incorporated by reference in their entireties. Further suitable materials for the first and second polymeric sheets 16, 18 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the cushioning article 10, engineering properties such as tensile strength, stretch properties, fatigue characteristics, dynamic modulus, and loss tangent can be considered. For example, the thicknesses of the first and second polymeric sheets 16, 18 used to form the cushioning article 10 can be selected to provide these characteristics.

As best shown in FIG. 3, the cushioning article 10 includes a tensile component 30 disposed in the interior cavity 22. The tensile component 30 includes a first tensile layer 32, a second tensile layer 34, and a plurality of tethers 36 spanning the interior cavity 22 from the first tensile layer 32 to the second tensile layer 34. The tethers 36 connect the first tensile layer 32 to the second tensile layer 34. Only some of the tethers 36 are indicated with reference numbers in FIG. 3. The tethers may also be referred to as fabric tensile members or threads, and may be in the form of drop threads that connect the first tensile layer 32 and the second tensile layer 34. The tensile component 30 may be formed as a unitary, one-piece textile element having a spacer-knit textile.

The first tensile layer 32 is bonded to an inner surface 42 of the first polymeric sheet 16, and the second tensile layer 34 is bonded to an inner surface 46 of the second polymeric sheet 18. More specifically, a first surface bond 40 joins the inner surface 42 of the first polymeric sheet 16 to the outer surface of the first tensile layer 32. A second surface bond 44 joins the inner surface 46 of the second polymeric sheet 18 to the outer surface of the second tensile layer 34, opposite the first tensile layer 32. In one or more embodiments, no anti-weld material is used on the inner surface 42 of the first polymeric sheet 16 or the outer surface of the first tensile layer 32, or on the inner surface 46 of the second polymeric sheet 18 or the outer surface of the second tensile layer 34, as entire interfacing portions of theses surfaces are bonded to one another.

The tethers 36 restrain separation of the first and second polymeric sheets 16, 18 to the maximum separated positions shown in FIG. 3 under a given inflation pressure of gas in the interior cavity 22. The outward force of pressurized gas in the interior cavity 22 places the tethers 36 in tension, and the tethers 36 prevent the tensile layers 32, 34 and polymeric sheets 16, 18 from further outward movement away from one another. However, the tethers 36 do not present resistance to compression when under a compressive load. When pressure is exerted on the cushioning article 10 such as due to a force of a dynamic impact of a wearer during running or other movements, the cushioning article 10 is compressed, and the polymeric sheets 16, 18 move closer together with the tethers 36 collapsing (i.e., going slack) in proportion to the pressure exerted on the first and second polymeric sheets 16, 18 adjacent the particular tethers 36.

Figure 8:
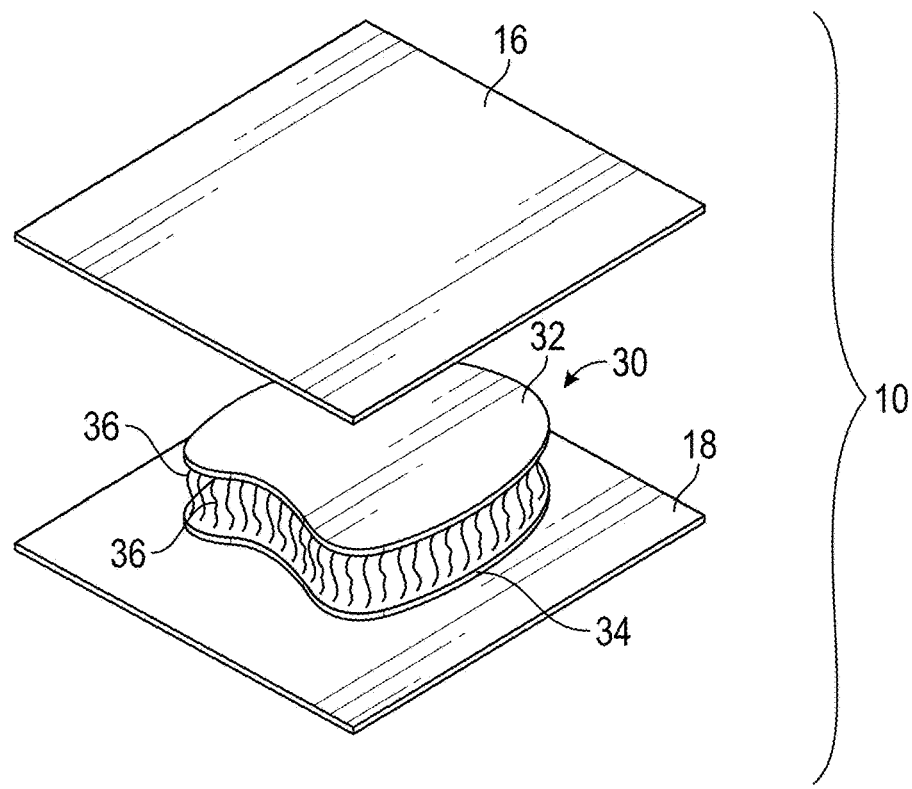
FIG. 8 is a schematic illustration in exploded view of components of the cushioning article of FIG. 1 prior to manufacturing the cushioning article.
Figure 10:
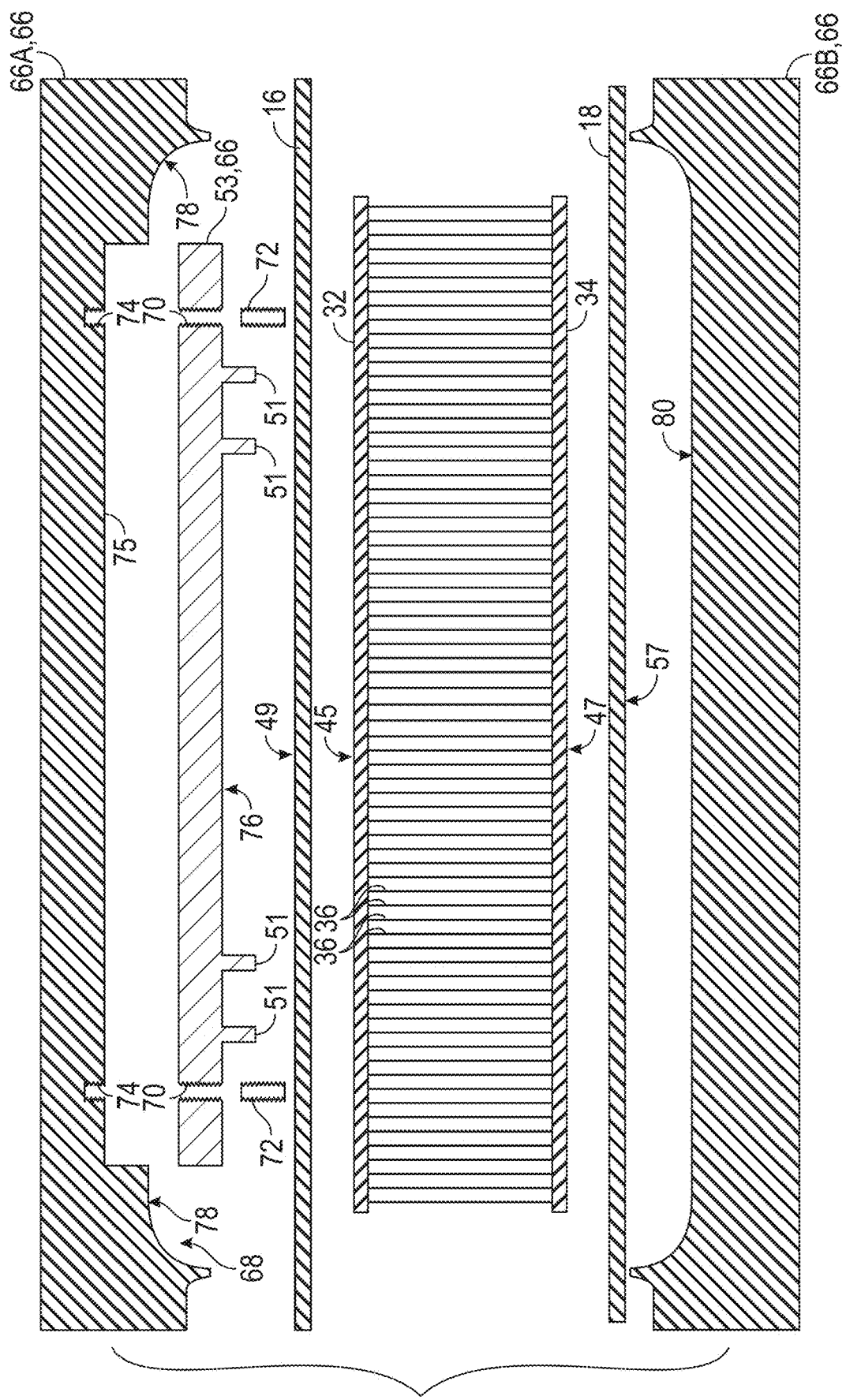
FIG. 10 is a schematic illustration in exploded cross-sectional view of components of the cushioning article of FIG. 1 and a mold used in manufacturing the cushioning article.

Prior to bonding to the first and second polymeric sheets 16, 18 according to the method 210 disclosed herein, the tethers 36 of the tensile component 30 may all be initial lengths, and possibly all substantially the same length, and the first and second tensile layers 32, 34 connected by the tethers 36 may have generally flat outer surfaces 45, 47, respectively, directly above the tethers 36 as shown in FIG. 10. In FIG. 8, the tethers 36 are represented in a slackened state as the tensile component 30 is not within a scaled interior cavity and is not subjected to tension in FIG. 8. In FIG. 10, the tethers 36 are also represented in a slackened state as FIG. 10 represents the tensile component 30 prior to securement within a sealed, pressurized interior cavity 22.

Under the method 210 provided herein, although the tethers 36 are originally of the same length and the outer surfaces 45, 47 of the first and second tensile layers 32, 34 and the outer surfaces 49, 57 of the first and second polymeric sheets 16, 18, respectively, are generally flat directly above the tethers (i.e., not contoured) prior to manufacture of the cushioning article 10, the method of manufacturing 210 produces an inwardly-protruding bond 50 that joins the first polymeric sheet 16 to the first tensile layer 32 and protrudes from the first polymeric sheet 16 toward the second polymeric sheet 18 directly into a region of the cavity occupied by some of the tethers 36. In fact, in FIG. 3, there are multiple inwardly-protruding bonds 50. Each bond 50 protrudes farther toward the second polymeric sheet 18 than the first surface bond 40.

Figure 9:
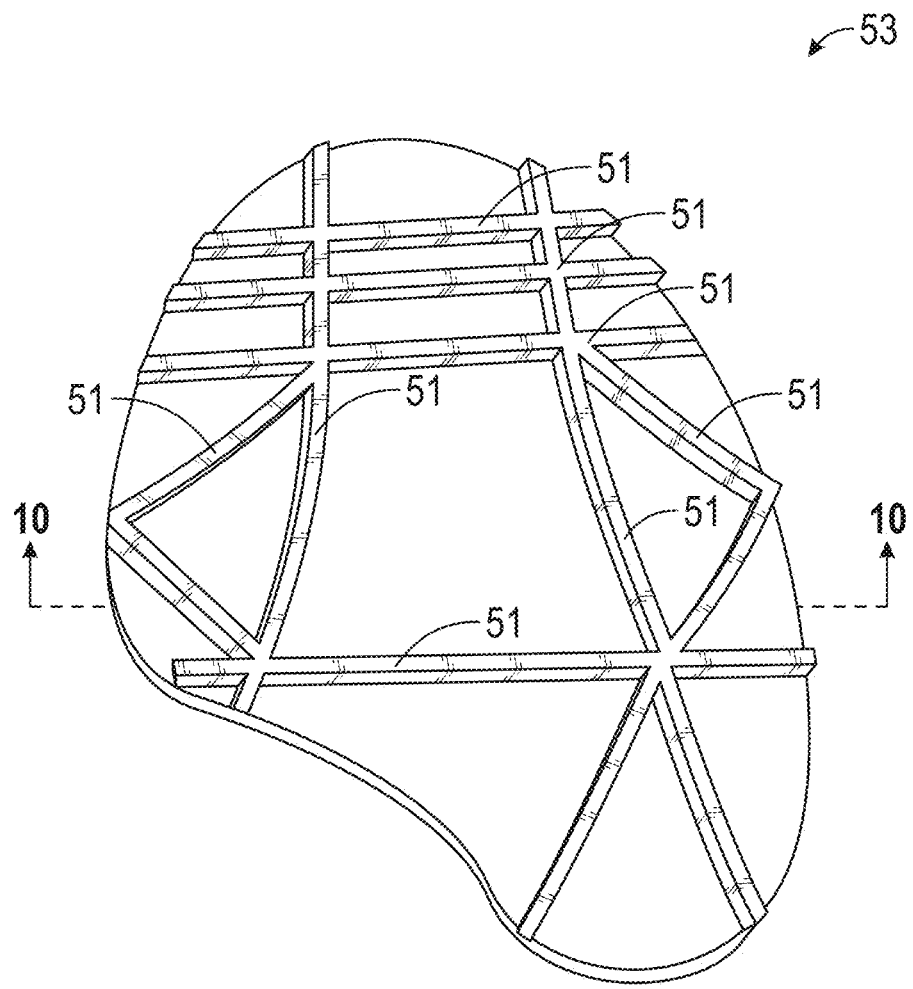
FIG. 9 is a schematic illustration in slightly perspective bottom view of a first mold insert used in a method of manufacturing the cushioning article of FIG. 1.

Each bond 50 results from a respective protrusion 51 of a mold component 53 that contacts the first polymeric sheet 16 during the method of manufacturing 210 disclosed herein. FIG. 9 shows a representative mold component 53 having the protrusions 51 in a first pattern that result in the bond pattern 55A of inwardly-protruding bonds 50 of the cushioning article 10 shown in FIG. 1. The mold component 53 is a mold insert, and may also be referred to as such, or may be referred to as a shim. The bonds 50 are indicated with hidden lines in the top view of FIG. 1 as they protrude inward from the outer surface 49 shown.

Figure 7:
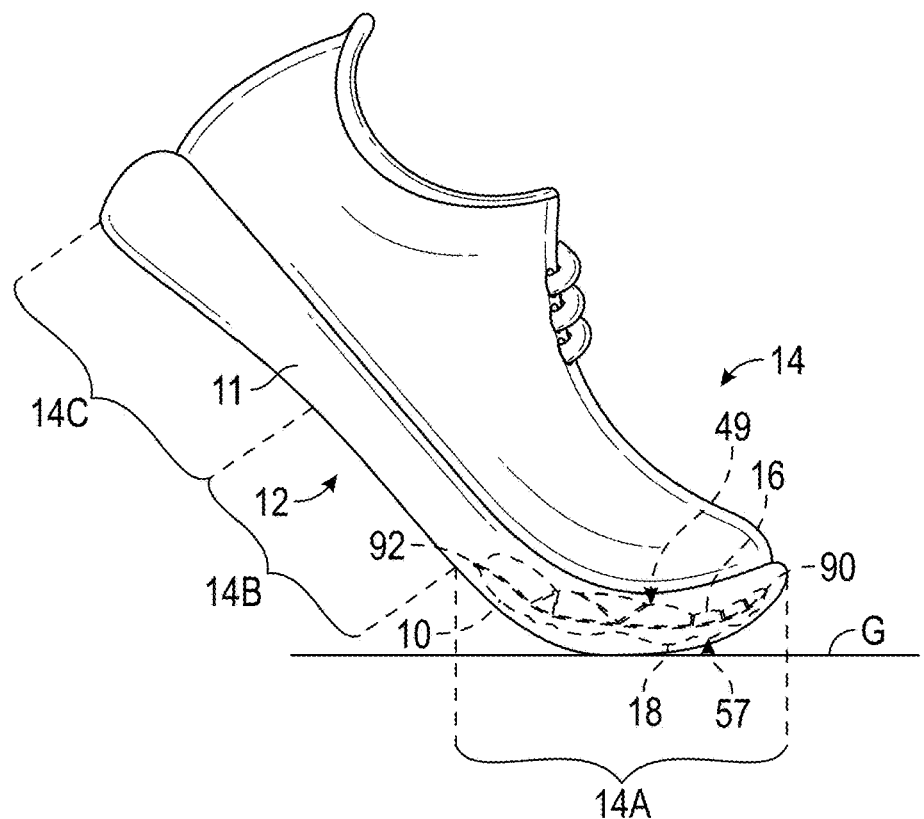
FIG. 7 is a schematic illustration in medial side view of an article of footwear with a sole structure that includes the cushioning article of FIG. 1, indicated in hidden lines.

The bonds 50 result in depressed grooves 52 at the outer surface 49 of the first polymeric sheet 16. Only some of the bonds 50 and some of the grooves 52 are indicated in FIG. 1 for clarity. In the embodiment shown, the inwardly-protruding bonds 50 are only at the first polymeric sheet 16. In other embodiments, the method of manufacturing 210 may provide inwardly-protruding bonds at the second polymeric sheet 18 as an alternative to or in addition to the inwardly-protruding bonds 50 at the first polymeric sheet 16. The outer surface 49 of the first polymeric sheet 16 may be the proximal side of the bladder 13 (i.e., the side closest to the foot) when assembled in a sole structure 12, and the outer surface 57 of the second polymeric sheet 18 may be the distal side of the cushioning article 10 (i.e., the ground-facing side of the bladder 13) as indicated in FIG. 7. As shown in FIG. 1, the bladder 13 is not symmetrical and is for use in a sole structure configured for a left foot. Stated differently, the shape of the bladder 13 generally follows the shape of a forefoot portion of a left foot. Additionally, the articulation due to the bonds 50 and grooves 52 as shown in FIGS. 6 and 7 is best achieved with the first polymeric sheet 16 on the proximal side. Nevertheless, if flipped so that the second sheet 18 is the proximal side, the cushioning article 10 could be used in a sole structure configured for a right foot.

Each inwardly-protruding bond 50 partially traverses the plurality of tethers 36 as shown in FIG. 3. Stated differently, the bonds 50 are directly outward of different ones of the tethers 36 and protrude inward on those tethers 36. The tethers 36 may be arranged in rows, with each row extending transversely between the tensile layers 32, 34, or in any other pattern in which the tethers 36 extend between the tensile layers 32, 34. Various different ones of the tethers 36 are aligned with the bonds 50. An inwardly-protruding bond 50 may traverse different rows of the tethers 36 such that different tethers from different rows are aligned with an inwardly-protruding bond 50, or an inwardly-protruding bond 50 may be directly aligned with a single row. Some of the inwardly-protruding bonds 50 could be between rows of tethers.

Referring to FIG. 6, the article of footwear 14 has a forefoot region 14A, a midfoot region 14B, and a heel region 14C. In FIG. 7, the bladder 13 is disposed in the forefoot region 14A. The bladder 13 is secured to the sole layer 11 and extends only in the forefoot region 14A as shown in FIG. 7. The bladder 13 has a forward end 90 and a rear end 92 shown in FIGS. 1, 6, and 7. The inwardly-protruding bonds 50 are disposed at the inner surface 42 of the bladder 13 and join the inner surface 42 to an outer surface 45 of the tensile component 30. More specifically, the inwardly-protruding bonds 50 are disposed at the inner surface 42 of the first polymeric sheet 16 and the outer surface 45 of the first tensile layer 32 and are spaced apart from the second polymeric sheet 18. The inwardly-protruding bonds 50 include parallel transverse bonds 50P, 50Q, 50R, and 50S extending from the peripheral flange 21 at a medial side 15 of the bladder 13 to the peripheral flange 21 at a lateral side 17 of the bladder 13 without intersecting one another, as shown in FIG. 1. The parallel transverse bonds 50P, 50Q, 50R, and 50S may also be referred to as straight transverse bonds. Stated differently, all references to parallel transverse bonds 50P, 50Q, 50R, and 50S herein may be considered references to straight transverse bonds. As best shown in FIG. 1, each of the straight transverse bonds 50P, 50Q, 50R, and 50S extends straight from the peripheral flange 21 at the medial side 15 of the bladder 13 to the peripheral flange 21 at the lateral side 17 of the bladder 13 without intersecting any of the other straight transverse bonds. The parallel transverse bonds 50P, 50Q, 50R, and 50S include forward transverse bonds 50P, 50Q, and 50R spaced apart from one another and a rear transverse bond 50S disposed rearward of the forward transverse bonds 50P, 50Q, and 50R. Stated differently, the straight transverse bonds 50P, 50Q, 50R, and 50S include forward transverse bonds 50P, 50Q, and 50R spaced apart from one another and a rear transverse bond 50S disposed rearward of the forward transverse bonds 50P, 50Q, and 50R. Adjacent ones of the forward transverse bonds 50P, 50Q, and 50R, such as adjacent forward transverse bonds 50P and 50Q, and adjacent forward transverse bonds 50Q and 50R are spaced closer to one another than a spacing between a rearmost one 50R of the forward transverse bonds 50P, 50Q, and 50R and the rear transverse bond 50S. More specifically, adjacent transverse bonds 50P and 50Q are spaced apart from one another by a spacing S1. Adjacent transverse bonds 50Q and 50R are spaced apart from one another by a spacing S2. The rearmost one (forward transverse bond 50R) of the forward transverse bonds 50P, 50Q, and 50R is spaced apart from the rear transverse bond 50S by a spacing S3. The spacing S3 is greater than the spacing S1. The spacing S3 is also greater than the spacing S2. As is clear in FIG. 1, the inwardly-protruding bonds 50 are non-symmetrical about a longitudinal axis LC of the cushioning article 10 and the peripheral flange 21 is non-symmetrical about the longitudinal axis LC of the cushioning article 10.

As is evident in FIG. 1, the parallel transverse bonds 50P, 50Q, 50R, and 50S include only four transverse bonds. Only three of these are the forward transverse bonds 50P, 50Q, and 50R. The parallel transverse bonds 50P, 50Q, 50R, and 50S establish the flexion axes F1, F2, F3, and F4, respectively. The inwardly-protruding bonds 50 further include two longitudinal bonds 50B and 50T extending from the peripheral flange 21 at the forward end 90 of the bladder 13 to the peripheral flange 21 at the rear end 92 of the bladder 13. Longitudinal bond 50B extends along and establishes the flexion axis F5 and the longitudinal bond 50T extends along and establishes the flexion axis F6. The two longitudinal bonds 50B and 50T intersect each of the parallel transverse bonds 50P, 50Q, 50R, and 50S without intersecting one another. Stated differently, the two longitudinal bonds 50B and 50T intersect each of the straight transverse bonds 50P, 50Q, 50R, and 50S without intersecting one another. The two longitudinal bonds 50B and 50T are the only longitudinal bonds extending from the peripheral flange 21 at the forward end 90 of the bladder 13 to the peripheral flange 21 at the rear end 92 of the bladder 13. The inwardly-protruding bonds 50 further include diagonal bonds 50U and 50V extending rearward and transversely outward from intersections of the rearmost one (forward transverse bond 50R) of the forward transverse bonds 50P, 50Q, and 50R and the longitudinal bonds 50B and 50T to the peripheral flange 21. More specifically, the inwardly-protruding bonds 50 include diagonal bond 50U extending rearward and transversely outward from the intersection of the rearmost one (forward transverse bond 50R) of the forward transverse bonds 50P, 50Q, and 50R and the longitudinal bond 50B to the peripheral flange 21. The inwardly-protruding bonds 50 also include diagonal bond 50V extending transversely outward from the intersection of the rearmost one (forward transverse bond 50R) of the forward transverse bonds 50P, 50Q, and 50R and the longitudinal bond 50T to the peripheral flange 21. The inwardly-protruding bonds 50 further include additional diagonal bonds 50W and 50X extending forward and transversely outward from intersections of the rear transverse bond 50S and the longitudinal bonds 50B and 50T to the peripheral flange 21. The additional diagonal bond 50W extends forward and transversely outward from the intersection of the rear transverse bond 50S and the longitudinal bond 50B to the peripheral flange 21. Additional diagonal bond 50X extends forward and transversely outward from the intersection of the rear transverse bond 50S and the longitudinal bond 50T to the peripheral flange 21. The diagonal bonds 50U and 50V meet the additional diagonal bonds 50W and 50X at the peripheral flange 21. Specifically, the diagonal bond 50U meets the additional diagonal bond 50W at the peripheral flange 21. The diagonal bond 50X meets the diagonal bond 50V at the peripheral flange 21. The inwardly-protruding bonds 50 further include a rearmost diagonal bond 50Y extending rearward from the intersection of the rear transverse bond 50S and the longitudinal bond 50B to the peripheral flange 21.

With reference to FIG. 3, the plurality of tethers 36 includes tethers 36A aligned with the inwardly-protruding bond 50 and tethers 36B displaced from the inwardly-protruding bond 50. Tethers 36A that are aligned with an inwardly-protruding bond 50 are deformed by heat, by compression of the overlaying of material of the first tensile layer 32, and/or by the overlaying material of the first tensile layer 32 coating the tethers 36A such that the tethers 36A are shorter, thicker, or both shorter and thicker at the inwardly-protruding bonds 50 than elsewhere. Such tethers are indicated with reference numeral 36A in FIG. 3 and may be referred to as modified tethers 36A. However, references to tethers 36 herein include tethers 36A and tethers 36B unless otherwise specified.

When the interior cavity 22 is inflated, the modified tethers 36A result in depressed grooves 52 in the outer surface 49 of the first polymeric sheet 16 as indicated in FIGS. 1 and 3. When an inflation pressure of the gas in the interior cavity 22 is sufficient to tension the plurality of tethers 36, the inwardly-protruding bonds 50 define grooves 52 at the outer surface 49 of the first polymeric sheet 16. At each groove 52, the cushioning article 10 is divided into what may be referred to as a first article portion 61 on one side of the groove 52 and a second article portion 62 on the other side of the groove 52, as indicated in FIG. 4. The first article portion 61 is articulated relative to the second article portion 62 along the groove 52. Stated differently, the outer surface 49 of the first polymeric sheet 16 at a first side of the inwardly-protruding bond 50 (the first side indicated in FIG. 4 as portion 49A of outer surface 49) is non-planar with the outer surface 49 of the first polymeric sheet at a second side of the inwardly-protruding bond 50 (the second side indicated in FIG. 4 as portion 49B of outer surface 49), the second side opposite of the first side.

The tension of the modified tethers 36A also causes recesses 56 in the outer surface 57 of the second polymeric sheet 18. The second polymeric sheet 18 is recessed inward toward a corresponding groove 52 and inwardly-protruding bond 50 at each recess 56 when the interior cavity 22 is inflated.

The physical deformation of the first polymeric sheet 16 and the first tensile layer 32 combined with the tension of the modified tethers 36A will cause the grooves 52 to be deeper than the recesses 56, which result only from the tension of the shortened modified tethers 36A. Accordingly, the cushioning article 10 may have an articulated shape, such as when not under loading at the grooves 52, as shown in FIG. 6. Additionally, the grooves 52 and recesses 56 together encourage articulation (i.e., flexion) of the cushioning article 10 to occur at the grooves 52, as the overall thickness of the cushioning article 10 is reduced at the grooves 52, decreasing bending stiffness of the cushioning article at the grooves 52.

The grooves 52 thus act as flexion axes of the cushioning article 10. For example, where the cushioning article 10 is included in the sole structure 12 of the article of footwear 14 in FIG. 7, the inwardly-protruding bonds 50 and resulting grooves 52 may establish flexion axes F1, F2, F3, F4 of the sole structure 12, with the flexion axes aligned with joints of the foot, such as the metatarsal phalangeal joints, thereby increasing flexibility of the sole structure 12. The flexion axes F1, F2, F3, F4 are indicated in FIGS. 1 and 6. Additional flexion axes F5 and F6 are created by the bonds 50 and grooves 52 that run generally longitudinally. Flexion axes F5 and F6 increase transverse (i.e. lateral) flexibility of the cushioning article 10.

Referring to FIGS. 3 and 4, each inwardly-protruding bond 50 is spaced apart from the second polymeric sheet 18 such that the interior cavity 22 is narrowed but not closed at the inwardly-protruding bond 50, and the gas in the interior cavity 22 can still fluidly communicate across the inwardly-protruding bond 50. The first tensile layer 32 is spaced apart from the second tensile layer 34 by a first distance D1 at a location adjacent to the inwardly-protruding bond 50, and the inwardly-protruding bond 50 is spaced apart from the second tensile layer 34 by a second distance D2. The first distance D1 may be the distance between the tensile layers 32, 34 at the tethers 36 that are not the modified tethers 36A. The second distance D2 may be the minimum distance between the inwardly-protruding bond 50 and the second tensile layer 34 (i.e., the distance at the most narrowed portion of the interior cavity 22 under the bond 50). In an embodiment, the method of manufacturing 210 may be controlled so that the second distance D2 is between 50 percent and 80 percent of the first distance D1. Bonds in this range of depth may create the most desirable amount of articulation for flexion, while maintaining fluid communication within the bladder 13 (i.e., not creating closed sub-chambers in the bladder). For example, factors that may influence the bond 50 and the extent of its protrusion toward the second polymeric sheet 18 can be controlled to provide this desired ratio of the second distance D2 to the first distance D1. Such factors may include the depth of the protrusion 51 that creates the bond 50, the temperature of the mold insert 53 or other mold components, the temperature of the components of the cushioning article 10, vacuum and/or inflation pressures in the mold cavity during manufacturing, the power of weld frequency if radio frequency welding is used, and other factors.

Accordingly, a portion 22A of the interior cavity 22 at a first side of the inwardly-protruding bond 50 is in fluid communication with a portion 22B of the interior cavity 22 at a second side of the inwardly-protruding bond 50, the second side opposite of the first side, as indicated in FIG. 4. The modified tethers 36A shown extending under the bond 50 between the two portions 22A, 22B are narrow in diameter and allow gas to flow around and between the tethers 36A from the portion 22A to the portion 22B and vice versa. This allows the gas to be displaced from the portion 22A to the portion 22B and from portion 22B to portion 22A when compressive forces are applied to the cushioning article 10, such as during impact of the article of footwear 14 with the ground G in FIG. 7. For example, as a foot rolls forward from heel to toe during a foot strike, the gas may be displaced from rearward in the cushioning article 10 to a portion more forward in the cushioning article 10. Supportive cushioning provided by the interior cavity 22 can thus be provided in areas most needed during use of the cushioning article 10.

In FIG. 3, the bond 50 labelled 50A may be referred to as a first inwardly-protruding bond, and the bond 50 labelled 50B may be referred to as a second inwardly-protruding bond. Like bond 50A, the bond 50B joins the first polymeric sheet 16 to the first tensile layer 32, protrudes inward from the first polymeric sheet 16 toward the second polymeric sheet 18, and at least partially traverses the tethers 36A of the tensile component 30. As is evident from FIGS. 1, 3, and 4 taken together, the second inwardly-protruding bond 50B intersects the first inwardly-protruding bond 50A at the cross-section of FIG. 5, and is spaced apart from the second polymeric sheet 18 such that the interior cavity 22 is narrowed but not closed at the second inwardly-protruding bond 50B. Accordingly, the gas in the interior cavity 22 fluidly communicates across the second inwardly-protruding bond 50B.

Figure 11:
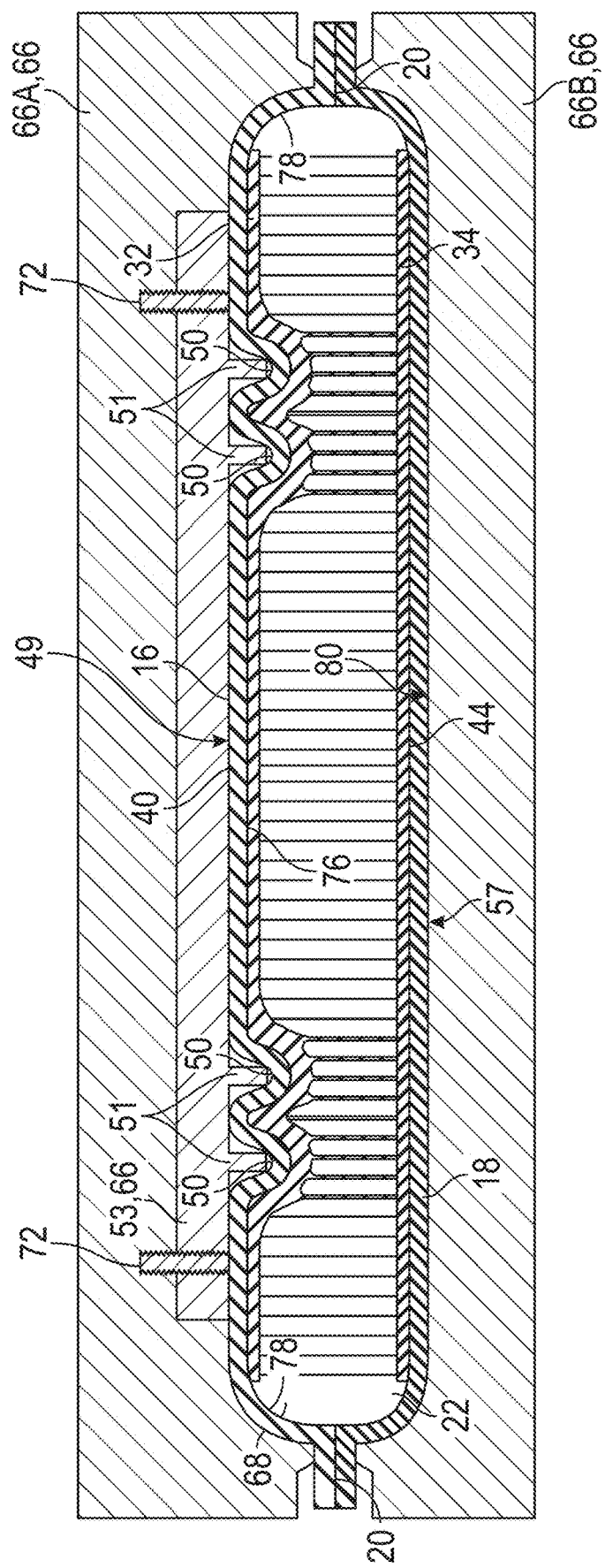
FIG. 11 is a schematic illustration of the components of the cushioning article of FIG. 1 in the mold of FIG. 10, with the mold in a closed position.

FIG. 10 shows the components of the cushioning article 10 in an exploded view and positioned between components of a mold 66. More specifically, the mold components of mold 66 include a first mold portion 66A, a second mold portion 66B, and the mold insert 53. FIG. 11 shows the components of the cushioning article 10 in a mold cavity 68 of the mold 66 defined by the mold components with the mold 66 in a closed position.

Figure 15:
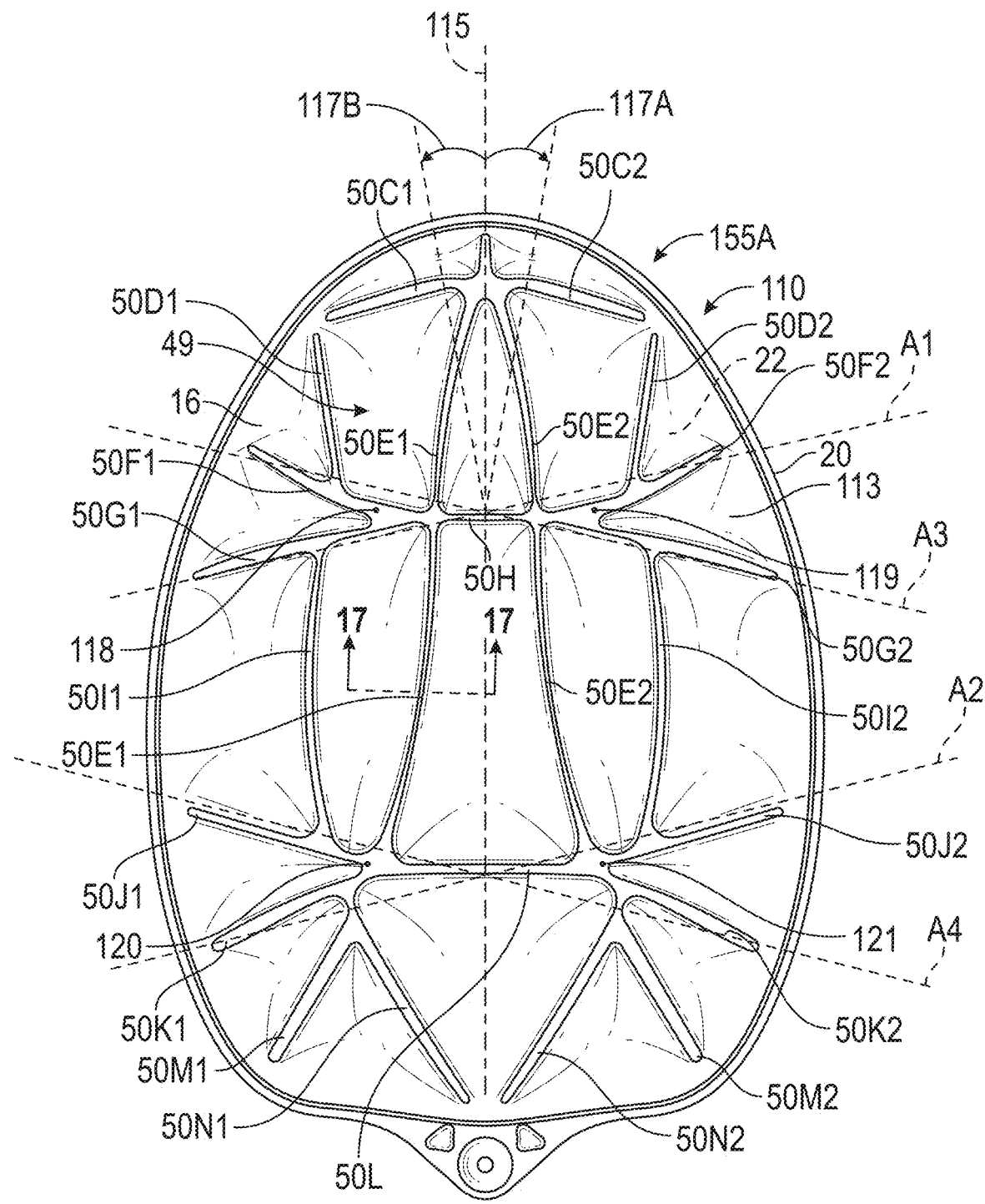
FIG. 15 is a schematic illustration in plan view of a cushioning article in accordance with the present teachings.
Figure 16:
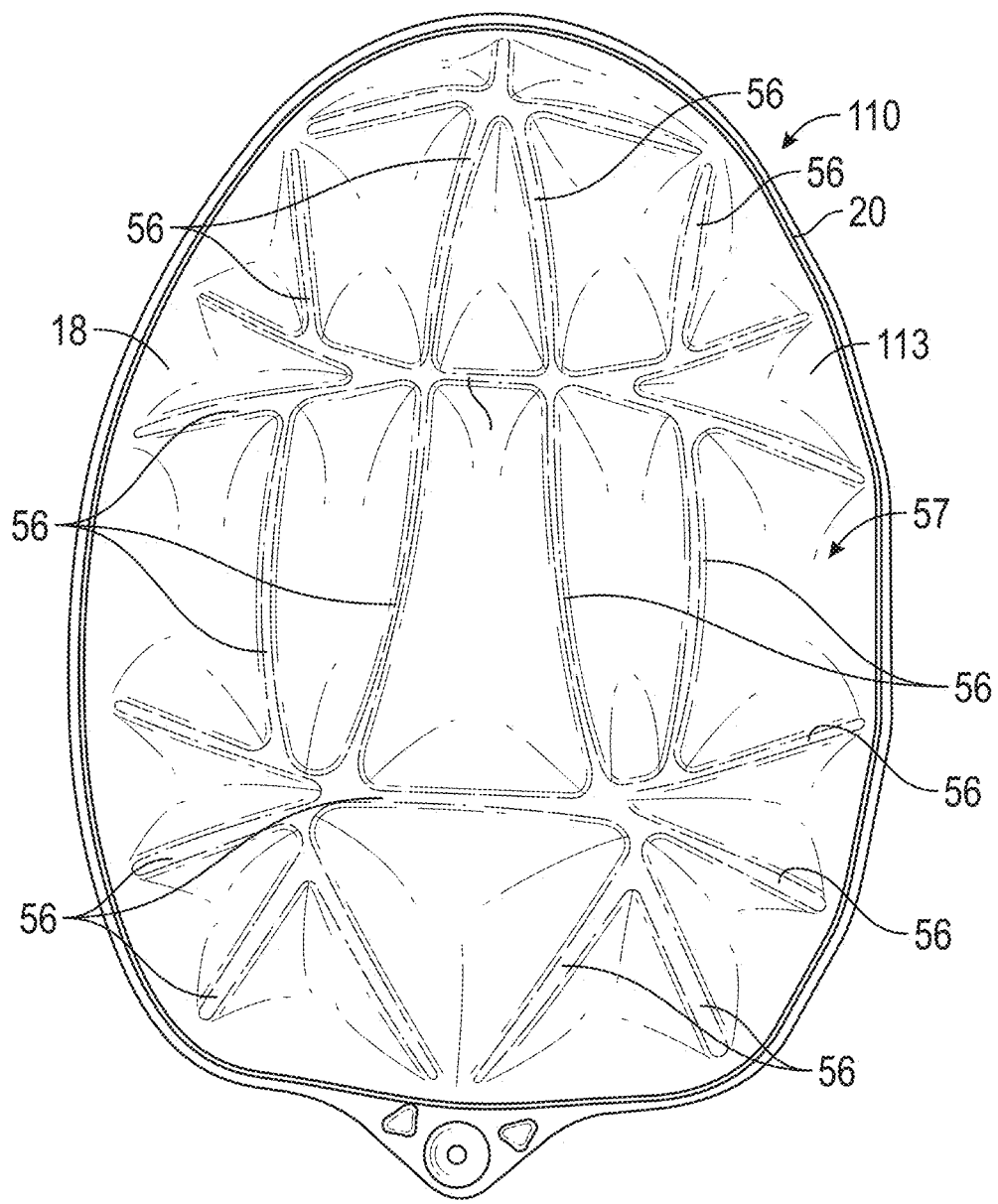
FIG. 16 is a schematic illustration in bottom view of the cushioning article of FIG. 15.
Figure 17:
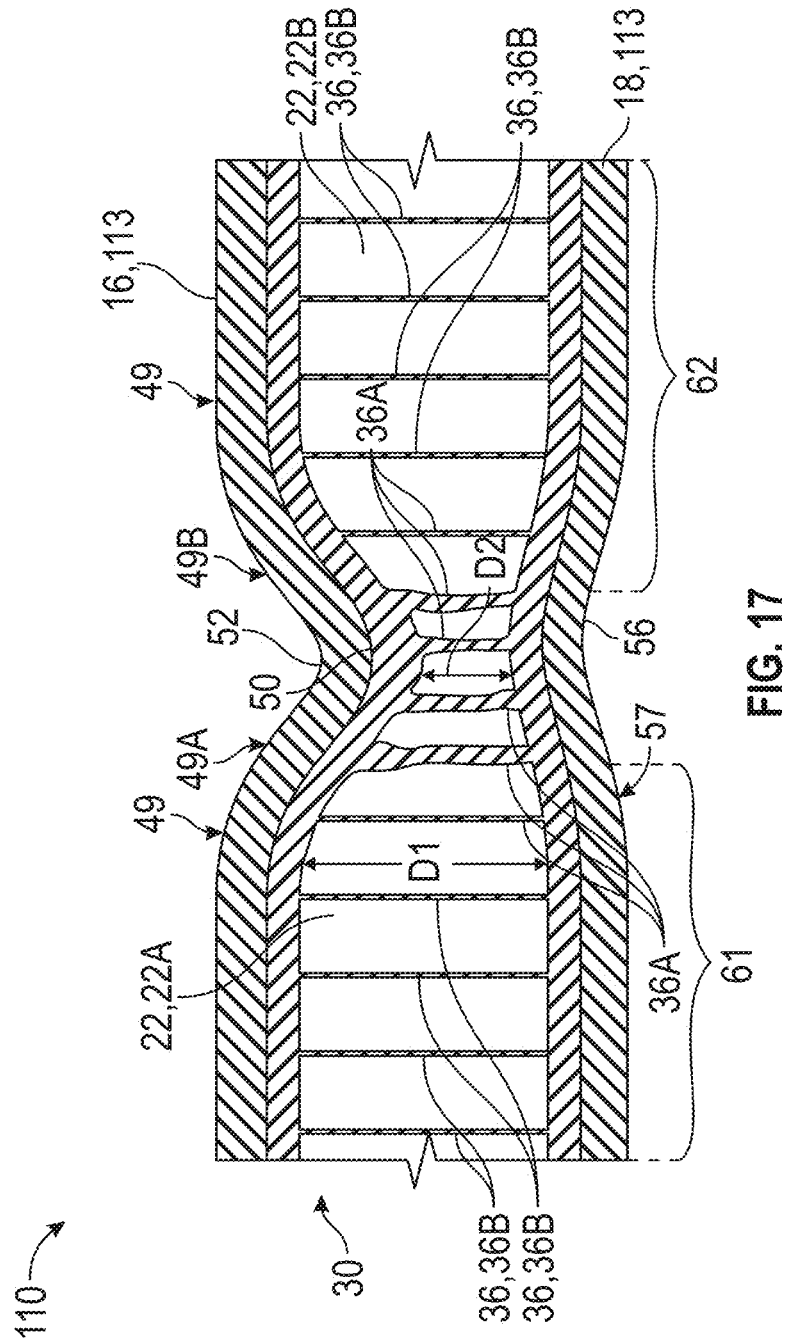
FIG. 17 is a schematic illustration in cross-sectional view of the cushioning article of FIG. 15, taken at lines 17-17 in FIG. 15.

FIGS. 15 and 16 show an alternative embodiment of a cushioning article 110 that has many of the same features as the cushioning article 10 which are indicated with like reference numerals. For example, first and second polymeric sheets 16, 18 are bonded to one another at a peripheral bond 20 to form a bladder 113 enclosing an interior cavity 22 and retaining a gas in the interior cavity. The tensile component 30 is disposed in the interior cavity 22 and is as secured to the inner surfaces of the polymeric sheets 16, 18 as shown in FIG. 17 and as described with respect to the cushioning article 10. As shown in FIG. 15, the outer surface 49 of the first polymeric sheet 16 is the proximal side of the bladder 113 when used in a sole structure such as sole structure 12 of FIG. 7, and the outer surface 57 of the second polymeric sheet 18 is the distal side. This enables the deeper grooves 52 of the cushioning article 110 (i.e., deeper than the recesses 56) and the tendency to flex at the grooves 52 in the manner shown in FIG. 7 to be matched to the movement of a foot in dorsiflexion.

In contrast to the cushioning article 10 and the bladder 13, the cushioning article 110 and the bladder 113 are symmetrical in overall shape at the outer perimeter (i.e., at the peripheral bond 20), and the plurality of inwardly-protruding bonds 50 are arranged on the proximal side of the bladder 113 in a symmetrical pattern 155A about an axis of symmetry 115 of the bladder 113. Corresponding recesses 56 at the distal side shown in FIG. 16 are also arranged in a symmetrical pattern about the axis of symmetry 115. Only some of the recesses 56 are labeled in FIG. 16. As discussed with respect to FIGS. 18A and 18B, the symmetrical pattern 155A of the bonds 50 enables the cushioning article 110 to be used in a sole structure configured for a right foot or a sole structure configured for a left foot without any difference in underfoot feel to the wearer.

The plurality of inwardly-protruding bonds 50 of the bladder 113 are labelled with alphanumeric identifiers (e.g., 50C1, etc.) in order to differentiate the bonds 50 for purposes of discussion. The bonds 50 includes a first central bond 50H extending across the axis of symmetry 115, and a second central bond 50L also extending across the axis of symmetry 115 and disposed generally parallel to and spaced from the first central bond 50H. Each of the central bonds 50H and 50L is symmetrical relative to the axis of symmetry 115. The bonds 50 also include symmetrical pairs of bonds, such as: bonds 50C1 and 50C2; bonds 50D1 and 50D2; bonds 50E1 and 50E2; bonds 50F1 and 50F2; bonds 50G1 and 50G2; bonds 50I1 and 50I2, bonds 50J1 and 50J2; bond 50K1 and 50K2; bonds 50M1 and 50M2; and bonds 50N1 and 50N1.

The bonds 50 include a first set of bonds 50G1, 50H, 50F2, and a second set of bonds 50K1, 50L, 50J2 spaced apart from one another and having parallel segments. For example, bonds 50G1 and 50K1 are segments that are parallel with one another, and bonds 50F2, 50J2 are also segments that are parallel with one another. The first set of bonds 50G1, 50H, 50F2 establishes a first articulation axis A1, and the second set of bonds 50K1, 50L, 50J2 establish a second articulation axis A2. Both axes A1 and A2 act as flexion axes for example when the cushioning article 110 bends in dorsiflexion along an axis at angle 117B (i.e., counterclockwise) relative to the first axis of symmetry 115. In the bladder 113 is rotated to this orientation, the axes A1, A2 would be generally perpendicular to the original position of the axis of symmetry 115 shown in FIG. 15.

The bonds 50 also include a third set of bonds 50F1, 50H, 50G2 and a fourth set of bonds 50J1, 50L, 50K2 spaced apart from the third set of bonds and having parallel segments. For example, bonds 50G2 and 50K2 are parallel segments, and bonds 50F1, 50J1 are also parallel segments. The third set of bonds 50F1, 50H, 50G2 establishes a third articulation axis A3 and the fourth set of bonds 50J1, 50L, 50K2 establishes a fourth articulation axis A4. Both axes A3 and A4 act as flexion axes, for example, when the cushioning article 110 bends in dorsiflexion along an axis at angle 117A relative to the axis of symmetry 115 having the same numerical value as angle 117B but a different direction (i.e. clockwise) relative to the axis of symmetry 115). If the bladder 113 is rotated to this orientation, the axes A3, A4 would be generally perpendicular to the original position of the axis of symmetry 115 shown in FIG. 15.

As shown in FIG. 15, the bonds 50 include the first central bond 50H extending across the axis of symmetry 115, and a pair of symmetrical forward-angled bonds 50F1, 50F2 extending from a first end 118 and a second end 119, respectively of the first central bond 50H. The bonds 50 also include a pair of symmetrical rearward-angled bonds 50G1, 50G2 extending from the first end 118 and the second end 119, respectively, of the first central bond 50H.

The bonds 50 further include the second central bond 50L extending across the axis of symmetry 115 and spaced from the first central bond 50H, and a pair of symmetrical forward-angled bonds 50J1, 50J2 extending from a first end 120 and a second end 121, respectively, of the second central bond 50L. The bonds 50 also include a pair of symmetrical rearward-angled bonds 50K1, 50K2 extending from the first end 120 and the second end 121, respectively, of the second central bond 50L.

The cushioning article 110 articulates at first and second flexion axes A1, A2 when the cushioning article 110 bends along an axis disposed at the first angle 117B counterclockwise from the axis of symmetry 115, and articulates at third and fourth flexion axes A3, A4 when the cushioning article 110 bends along an axis disposed at the first angle 117A clockwise from the axis of symmetry 115. Accordingly, with reference to FIG A. 18A and 18B, cushioning articles 110A and 110B are identical to cushioning article 110 and to each other except for their orientation relative to the respective sole structures 12R, 12L. By securing the cushioning article 110A in a sole structure 12R configured for a right foot in a position in which the cushioning article 110A is rotated clockwise by the first angle 117B relative to a longitudinal bending axis LA of a sole structure 12R, the cushioning article 110A will articulate (i.e., flex) along the first axis A1 and the second axis A2 when the right foot dorsiflexes. By securing the cushioning article 110B in a sole structure 12L configured for a left foot in a position in which the cushioning article 110B is rotated counterclockwise by the first angle 117A relative to a longitudinal bending axis LA of a sole structure 12L, the cushioning article 110B will articulate along the third axis A3 and the fourth axis A4 when the left foot dorsiflexes. Alternatively, the cushioning article 110A can be rotated counterclockwise when secured to the right foot sole structure 12R and the cushioning article 110B can be rotated clockwise when secured to the left foot sole structure 12L in which case the cushioning article 110A of the right foot sole structure 12R will articulate along flexion axes A3 and A4, and the cushioning article 110B of the left foot sole structure 12L will articulate along the flexion axes A1 and A2 during dorsiflexion of the respective right foot and left foot. In this manner, economies of scale can be achieved in manufacturing by using identically configured cushioning articles 110 in both right foot articles of footwear and left foot articles of footwear.

A method 210 of manufacturing a cushioning article, such as cushioning article 10, is shown in the flow chart of FIG. 19, and is described with reference to FIGS. 10 and 11. The method 210 may begin with block 212, securing a first mold insert 53 with a first protrusion pattern to the first mold portion 66A. For example, the first mold insert 53 has openings 70 that receive fasteners 72. The fasteners 72 extend into openings 74 in the first mold portion 66A to secure the first mold insert 53 to the first mold portion 66A. The openings 74 are in a recess 75 of the first mold portion 66A, and the insert 53 fits within the recess 75 so that the surface 76 is flush with adjacent surfaces 78 of the first mold portion 66A. The openings 70, 74 and the fasteners 72 may be threaded, for example. When disposed as set forth in block 212, the mold insert 53 is therefore in and partially defines the mold cavity 68.

Next, in block 214, prior to disposing the components of the cushioning article 10 into the open mold cavity 68, the components of the cushioning article 10, the mold components, or both, may be pre-heated to help expedite the subsequent thermoforming that occurs via the combined blocks 218, 220. In embodiments of the method 210 in which the mold component having the protrusion that creates the inwardly-protruding bond is one of the mold portions 66A or 66B rather than a mold insert 53, the method 210 may instead begin with block 214.

In block 216, the first and second polymeric sheets 16, 18 and the tensile component 30 are then disposed in the mold cavity 68, with the first tensile layer 32 positioned adjacent the first polymeric sheet 16, the second tensile layer 34 positioned adjacent the second polymeric sheet 18, and the plurality of tethers 36 connecting the first tensile layer to the second tensile layer. Block 216 may comprise placing first and second polymeric sheets 16, 18 and the tensile component 30 between the open mold portions 66A, 66B. This may be accomplished by the use of shuttle frames (not shown) that separately hold the various components of the cushioning article 10 in alignment with one another and with the mold components 66A, 66B, 53, as shown in FIG. 10. In an embodiment, one or both of the first and second polymeric sheets 16, 18 may already by bonded to the respective tensile layers 32, 34 of the tensile component 30 when placed in the mold cavity 68, such as by lamination or by the use of adhesive. In such an embodiment, block 220 is not necessary. If only one of the first and second polymeric sheets 16, 18 is laminated to the respective tensile layer 32, 34 prior to placement of the components in the mold cavity 68 and thermoforming, the completed cushioning article 10 will tend to curl along its longitudinal axis toward the side that is not pre-laminated. Alternatively, as shown in FIG. 10, the first and second polymeric sheets 16, 18 may not yet be bonded to the tensile component 30 when disposed in the mold cavity 68. Once the components of the cushioning article 10 are positioned, one or both of the mold components 66A, 66B is translated toward the other mold component to close the mold cavity 68.

Next, in block 218, the first polymeric sheet 16 and the second polymeric sheet 18 are conformed to components of the mold 66, as shown in FIG. 11. For example, the outer surface 49 of the first polymeric sheet 16 is conformed to the surface 76 of the mold insert 53. The surface 76 includes the protrusions 51. Portions of the outer surface 49 of the first polymeric sheet 16 are conformed directly to the mold surface 78 of the first mold portion 66A adjacent to the mold insert 53. Conforming of the first polymeric sheet 16 to the surface 76, including the protrusions 51, in this manner depresses the first polymeric sheet 16 toward the second polymeric sheet 18 at the protrusions 51, with the protrusions 51 directly outward of some of the plurality of tethers 36. In block 218, the outer surface 57 of the second polymeric sheet 18 is also conformed to the mold surface 80 of the second mold component 66B, as indicated in FIG. 11. Conforming the polymeric sheets 16, 18 to the surfaces 76, 78, 80 may include applying a vacuum to the mold cavity 68 to pull the sheets 16, 18 against the surfaces 76, 78, 80. Alternatively or in addition, conforming the polymeric sheets 16, 18 to the surfaces 76, 78, 80 may include pressurizing the mold cavity 68, thereby compressing the polymeric sheets 16, 18 against the surfaces 76, 78, 80.

After or contemporaneously with the first and second polymeric sheets 16, 18 conforming to the surfaces 76, 78, 80 in block 218, the first tensile layer 32 may be thermally bonded to the first polymeric sheet 16 and the second tensile layer 34 may be thermally bonded to the second polymeric sheet 18 opposite the first tensile layer 32 in block 220. The heating of the polymeric sheets 16, 18, the tensile layers 32, 34, and/or the mold components 53, 66A, 66B in addition to the vacuum and/or pressurization of the mold cavity 68 enables the thermal bonding at the surface bonds 40, 44 and the inwardly-protruding bonds 50. When the components are cooled, the bonds 40, 44, 50 remain. Conforming in block 218 and thermally bonding in block 220 may be referred to as thermoforming, and produces the inwardly-protruding bonds 50 at the protrusions 51 that join the first polymeric sheet 16 and the first tensile layer 32 and partially traverse the plurality of tethers 36, with the inwardly-protruding bonds 50 protruding toward the second polymeric sheet 18 but remaining spaced apart from the second tensile layer 34 and the second polymeric sheet 18 as described with respect to FIG. 3.

The thermal bonding of block 220 may include heating the first polymeric sheet 16 and the second polymeric sheet 18 prior to disposing the first polymeric sheet 16 and the second polymeric sheet 18 in the mold cavity 68. Alternatively or in addition, the thermal bonding may include heating one or more of the mold components 53, 66A, 66B, or radio frequency welding via the mold 66.

Following block 220 or contemporaneously with block 220, the method 210 may include block 222, bonding the first polymeric sheet 16 to the second polymeric sheet 18 at the peripheral bond 20 such that the first polymeric sheet 16 and the second polymeric sheet 18 at least partially enclose the interior cavity 22 containing the tensile component 30. For example, bonding the first polymeric sheet 16 and the second polymeric sheet 18 at the peripheral bond 20 in block 222 may include compressing the first polymeric sheet 16 and the second polymeric sheet 18 between the first mold portion 66A and the second mold portion 66B in the closed position, as shown in FIG. 11. A small portion of the periphery of the first and second polymeric sheets 16, 18 can be left unbonded, such as at an inflation port 82 molded into the sheets in blocks 218 and 220.

After block 222, the mold cavity 68 may be opened in block 224 by translating one or both of the mold portions 66A, 66B away from one another. The cushioning article 10 can then be removed from the mold cavity 68 in block 226.

In block 228, the interior cavity 22 can be inflated to a desired inflation pressure, such as through the inflation port 82 of FIG. 1. For example, a fill tube may fit into the inflation port 82 or may be integrally formed by the sheets 16, 18 at the inflation port 82. Prior to or after inflating the interior cavity 22 in block 228, excess material of the sheets 16, 18 around the peripheral bond 20 can be trimmed. Gas, such as air, can be dispensed from a pressurized source or pumped into the interior cavity 22 through the inflation port 82 from a pressurized source. In some embodiments, the interior cavity 22 is not inflated, but instead simply retains gas at atmospheric pressure.

The interior cavity 22 is sealed in block 230. In the embodiment shown, this may be accomplished by sealing the inflation port 82, such as by thermally bonding the sheets 16, 18 to one another at the inflation port 82, adhering the sheets 16, 18 to one another at the inflation port 82, or plugging the inflation port 82. In FIG. 1, the sheets 16, 18 and any fill tube is already trimmed, and the inflation port 82 is sealed. The cushioning article 10 is completely manufactured once block 230 is completed, and is ready to be assembled in the article of footwear 14. If the interior cavity 22 is inflated to a sufficient pressure, the plurality of tethers 36 are tensioned, creating the grooves 52 in the outer surface 49 of the first polymeric sheet 16 at the inwardly-protruding bonds 50, thereby articulating the cushioning article 10 as discussed with respect to FIG. 6, with the grooves 52 establishing flexion axes.

Figure 18:
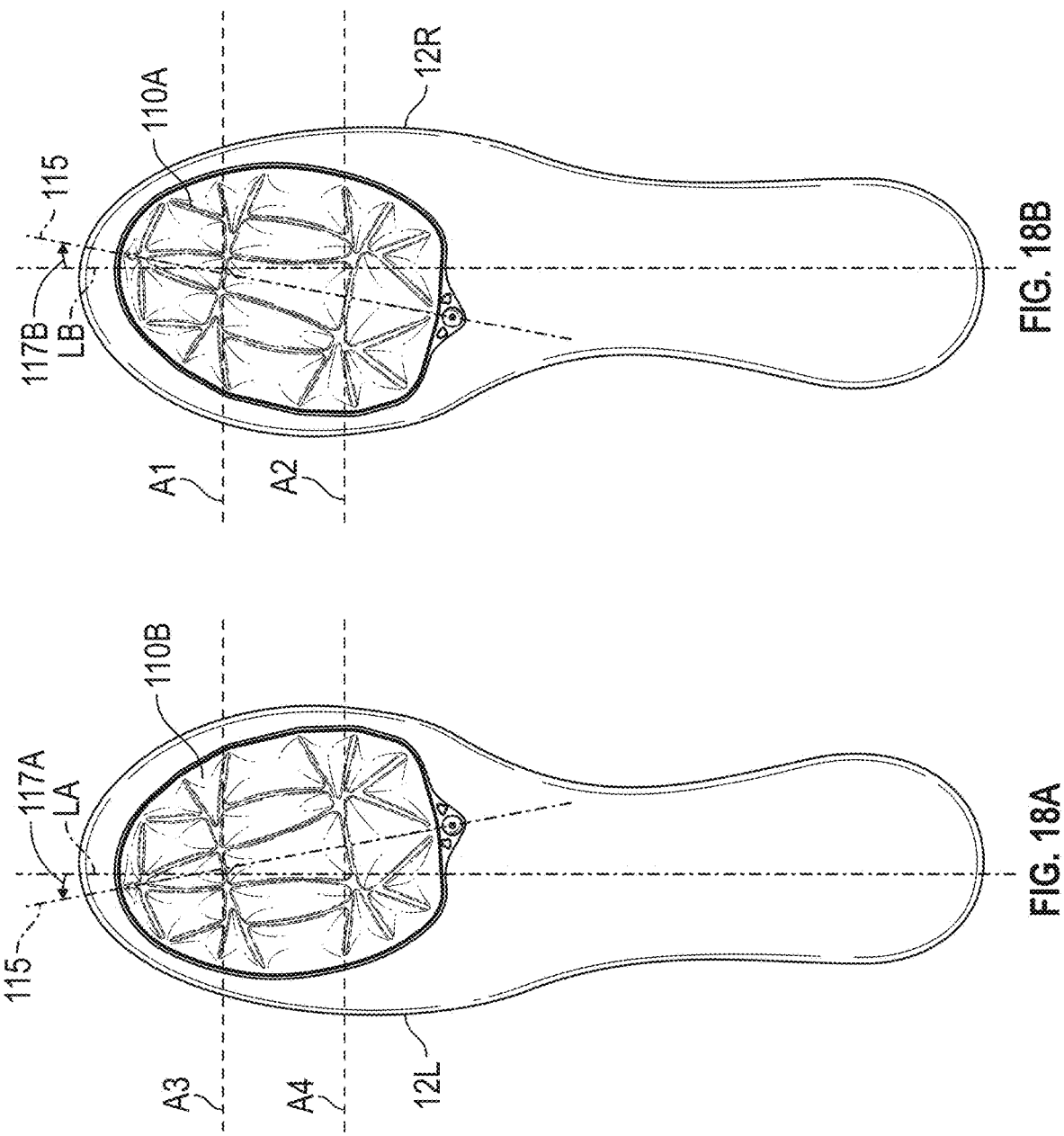
FIG. 18A is a schematic illustration in plan view of a sole structure configured for a left foot.
FIG. 18B is a schematic illustration in plan view of a sole structure configured for a right foot.

The method 210 may be used to manufacture the cushioning article 110 having bonds with a symmetrical configuration. In such an embodiment, the method 200 may include block 232, securing the cushioning article 110 (denoted as cushioning article 110A in FIG. 18B) to a first sole structure 12R configured for a right foot with the axis of symmetry 115 of the cushioning article 110A rotated at a first angle 117B clockwise (or counterclockwise) relative to a longitudinal axis LA of the first sole structure. The method 210 may also include block 234, securing a second cushioning article 110B configured identically to the cushioning article 110A (and as described herein with respect to cushioning article 110) to a second sole structure 12L configured for a left foot with the axis of symmetry 115 of the second cushioning article 110B rotated at the first angle 117A counterclockwise (or clockwise if the cushioning article 110A of the first sole structure 12R is rotated counterclockwise) relative to a longitudinal axis LA of the second sole structure 12L as shown in FIG. 18A. With the configuration shown in FIGS. 18A and 18B, the cushioning article 110A will articulate along axes A1 and A2, and the cushioning article 110B will articulate along axes A3 and A4, both cushioning articles 110A, 110B therefore generally aligning in the same manner with the joints of the right foot as with the joints of the left foot when the sole structures 12R, 12L are assembled in articles of footwear worn by a wearer on a right foot and a left foot, respectively.

Figure 12:
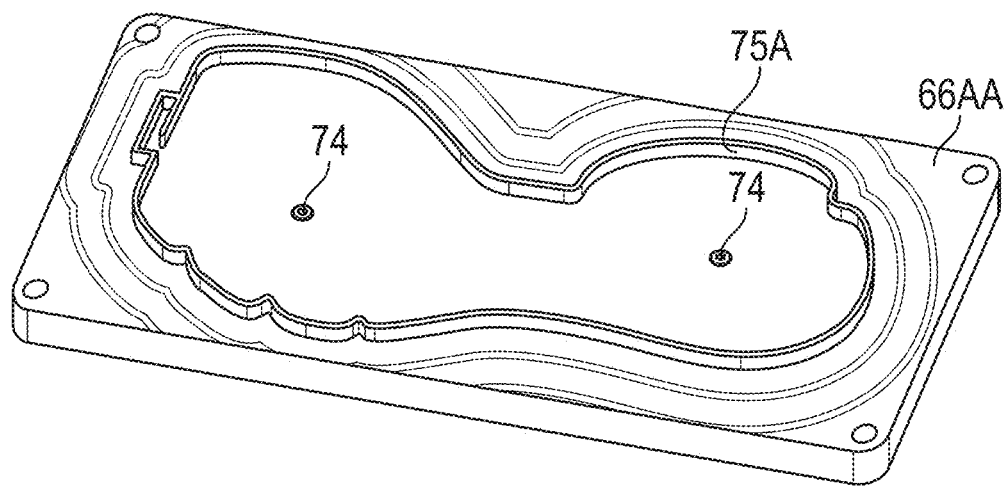
FIG. 12 is a schematic perspective illustration of a mold portion for manufacturing an alternative cushioning component in accordance with an alternative aspect of the present teachings.
Figure 13:
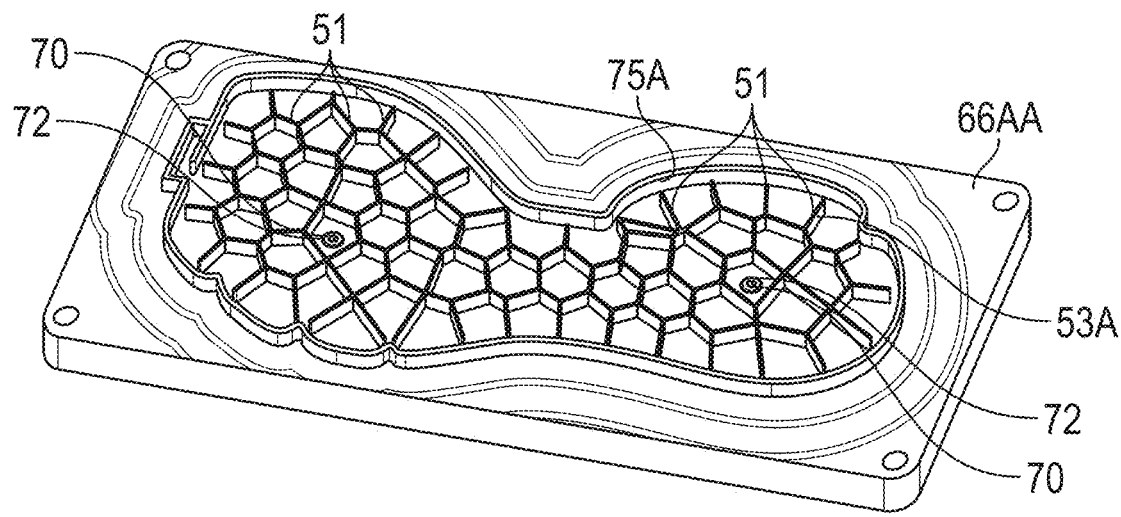
FIG. 13 is a schematic perspective illustration of the mold portion of FIG. 12 with a first mold insert secured to the mold portion.

It should be appreciated that, although in FIGS. 10-11 the mold component having the protrusions 51 that create the inwardly-protruding bonds 50 is a mold insert 53, either or both of the mold portions 66A, 66B could have one or more protrusions, and no mold insert need be used. However, the use of mold inserts may allow the production of cushioning articles having different bond patterns with lower tooling expense. For example, the same mold portions 66A, 66B may be used with a different tooling insert to produce cushioning articles with different bond patterns. FIG. 12 shows a mold portion 66AA for a cushioning article for a full length sole structure. The mold portion 66AA may be used in a mold similar to mold 66 in the same position as mold portion 66A. The mold portion 66AA has a recess 75A similar to recess 75 at which a mold insert may be secured with fasteners extending into openings 74 similar to mold insert 53. FIG. 13 shows a first mold insert 53A that has a first pattern of protrusions 51. The first mold insert 53A is secured to the mold portion 66AA within the recess 75A. When the mold portion 66AA and first mold insert 53A are used in a mold according to blocks 212 to 230 of the method of manufacturing 210, a cushioning article that is a full length sole component with a first bond pattern (i.e., a bond pattern produced by the pattern of protrusions 51 of the mold insert 53A) will be manufactured according to the method 210.

Figure 14:
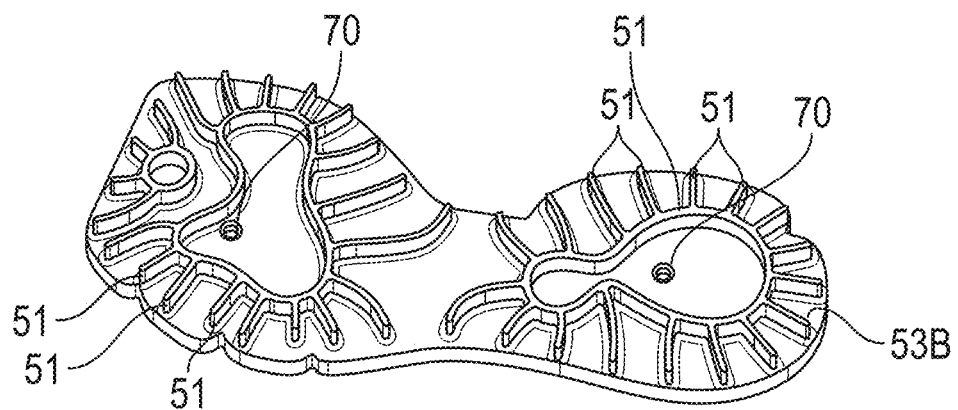
FIG. 14 is a schematic perspective illustration of a second mold insert for use with the mold portion of FIG. 12.

FIG. 14 shows a second mold insert 53B with a second pattern of protrusions 51. The protrusions 51 of the second mold insert 53B are shaped or dimensioned differently than the protrusions 51 of the first mold insert 53A such that the second pattern of protrusions 51 is different than the first pattern of protrusions. After manufacturing the cushioning article having a first bond pattern (i.e., a first pattern of inwardly-protruding bonds corresponding to the first pattern of protrusions of the first mold insert 53A), the method 210 may include block 236, removing the first mold insert 53A from the mold cavity 68. Then, in block 238, the second mold insert 53B may be secured to the mold portion 66AA, using fasteners 72 extending through openings 70, 74 as described with respect to the mold insert 53A. With the second mold insert 53B now disposed in the mold cavity 68, blocks 212 to 230 of the method 210 can now be repeated to manufacture a second cushioning article that is a full length sole component having a different bond pattern than the first full length sole component produced using mold insert 53A, the different bond pattern being a pattern of inwardly-protruding bonds 50 as described herein, but corresponding to the different pattern of protrusions of the second mold insert 53B. For example, in repeating blocks 212 to 230, block 216 is repeated by disposing a subsequent first polymeric sheet, a subsequent second polymeric sheet, and a subsequent tensile component in the mold cavity 68 with the subsequent tensile component between the subsequent first polymeric sheet and the subsequent second polymeric sheet. Block 218 is repeated by conforming the subsequent first polymeric sheet and the subsequent second polymeric sheet to the second mold insert 53B and to another one of the mold components (e.g., a mold component similar to mold component 66B), respectively, the conforming depressing the subsequent first polymeric sheet toward the subsequent second polymeric sheet at the second protrusion 51 (i.e., at one of the protrusions 51 of the second mold portion 53B), with the second protrusion directly outward of the subsequent tensile component. For example, block 220 is repeated, thermally bonding the first tensile layer of the subsequent tensile component to the subsequent first polymeric sheet and the second tensile layer of the subsequent tensile component to the subsequent second polymeric sheet to produce a second inwardly-protruding bond at the second protrusion partially traversing the subsequent tensile component, the same mold portions and mold cavity thus providing a second cushioning article with a different bond pattern than the first cushioning article due to the second mold insert 53B, and simply by removing the first mold insert 53A and replacing it with the second mold insert 53B.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. An article of footwear having a forefoot region, the article of footwear comprising:
    a cushioning article including:
        a bladder disposed in the forefoot region and having a forward end, a rear end, and a peripheral flange, the bladder enclosing an interior cavity and retaining a gas in the interior cavity;
        a tensile component disposed in the interior cavity, the tensile component including tensile layers and a plurality of tethers connecting the tensile layers, the tensile layers connected to an inner surface of the bladder such that the tethers span across the interior cavity;
        wherein the bladder has inwardly-protruding bonds that are disposed at the inner surface of the bladder and join the inner surface of the bladder to an outer surface of the tensile component, protrude inward into the interior cavity, and partially traverse the plurality of tethers such that the bladder is narrowed at the inwardly-protruding bonds and the gas in the interior cavity fluidly communicates across the inwardly-protruding bonds; and
        wherein the inwardly-protruding bonds include straight transverse bonds, each of the straight transverse bonds extending from the peripheral flange at a medial side of the bladder to the peripheral flange at a lateral side of the bladder without intersecting any of the other straight transverse bonds.

2. The article of footwear of claim 1, wherein the straight transverse bonds include forward transverse bonds spaced apart from one another and a rear transverse bond disposed rearward of the forward transverse bonds.

3. The article of footwear of claim 2, wherein adjacent ones of the forward transverse bonds are spaced closer to one another than a spacing between a rearmost one of the forward transverse bonds and the rear transverse bond.

4. The article of footwear of claim 1, wherein the inwardly-protruding bonds further include two longitudinal bonds extending from the peripheral flange at the forward end of the bladder to the peripheral flange at the rear end of the bladder, the two longitudinal bonds intersecting each of the straight transverse bonds without intersecting one another.

5. The article of footwear of claim 1, wherein the straight transverse bonds include three transverse bonds.

6. The article of footwear of claim 5, wherein the straight transverse bonds include only four transverse bonds.

7. The article of footwear of claim 1, wherein the inwardly-protruding bonds are non-symmetrical about a longitudinal axis of the cushioning article.

8. The article of footwear of claim 7, wherein an outer perimeter of the bladder at the peripheral flange is non-symmetrical about a longitudinal axis of the cushioning article.

9. The article of footwear of claim 1, wherein the cushioning article extends only in the forefoot region of the article of footwear.

10. The article of footwear of claim 1, wherein the straight transverse bonds establish flexion axes at which the cushioning article articulates.

11. The article of footwear of claim 10, wherein the flexion axes are aligned with metatarsal-phalangeal joints of a foot for which the article of footwear is configured.

12. The article of footwear of claim 1, wherein, when an inflation pressure of the gas in the interior cavity is sufficient to tension the plurality of tethers, the inwardly-protruding bonds define grooves at an outer surface of the bladder.

13. The article of footwear of claim 1, wherein the bladder comprises a first polymeric sheet and a second polymeric sheet bonded to one another at the peripheral flange and enclosing the interior cavity;
    wherein the inner surface of the bladder includes an inner surface of the first polymeric sheet and an inner surface of the second polymeric sheet;
    wherein the tensile layers include a first tensile layer connected to the first polymeric sheet and a second tensile layer connected to the second polymeric sheet;
    wherein the outer surface of the tensile component includes an outer surface of the first tensile layer and an outer surface of the second tensile layer; and
    wherein the inwardly-protruding bonds are disposed at the inner surface of the first polymeric sheet and the outer surface of the first tensile layer and are spaced apart from the second polymeric sheet, the second polymeric sheet not including any of the inwardly-protruding bonds.

14. The article of footwear of claim 1, wherein the article of footwear has a midfoot region and a heel region, and the article of footwear further comprising:
    a sole layer extending in the forefoot region, in the midfoot region, and in the heel region of the article of footwear; and
    wherein the bladder is secured to the sole layer and extends only in the forefoot region of the article of footwear.

15. An article of footwear having a forefoot region, the article of footwear comprising:
    a cushioning article including:
        a bladder disposed in the forefoot region and having a forward end, a rear end, and a peripheral flange, the bladder enclosing an interior cavity and retaining a gas in the interior cavity;
        a tensile component disposed in the interior cavity, the tensile component including tensile layers and a plurality of tethers connecting the tensile layers, the tensile layers connected to an inner surface of the bladder such that the tethers span across the interior cavity;
        wherein the bladder has inwardly-protruding bonds that are disposed at the inner surface of the bladder and join the inner surface of the bladder to an outer surface of the tensile component, protrude inward into the interior cavity, and partially traverse the plurality of tethers such that the bladder is narrowed at the inwardly-protruding bonds and the gas in the interior cavity fluidly communicates across the inwardly-protruding bonds;

wherein the inwardly-protruding bonds include straight transverse bonds, each of the straight transverse bonds extending from the peripheral flange at a medial side of the bladder to the peripheral flange at a lateral side of the bladder without intersecting any of the other straight transverse bonds;

wherein the inwardly-protruding bonds further include two longitudinal bonds extending from the peripheral flange at the forward end of the bladder to the peripheral flange at the rear end of the bladder, the two longitudinal bonds intersecting each of the straight transverse bonds without intersecting one another; and wherein the two longitudinal bonds are the only longitudinal bonds extending from the peripheral flange at the forward end of the bladder to the peripheral flange at the rear end of the bladder.

16. An article of footwear having a forefoot region, the article of footwear comprising:
 a cushioning article including:
  a bladder disposed in the forefoot region and having a forward end, a rear end, and a peripheral flange, the bladder enclosing an interior cavity and retaining a gas in the interior cavity;
  a tensile component disposed in the interior cavity, the tensile component including tensile layers and a plurality of tethers connecting the tensile layers, the tensile layers connected to an inner surface of the bladder such that the tethers span across the interior cavity;
  wherein the bladder has inwardly-protruding bonds that are disposed at the inner surface of the bladder and join the inner surface of the bladder to an outer surface of the tensile component, protrude inward into the interior cavity, and partially traverse the plurality of tethers such that the bladder is narrowed at the inwardly-protruding bonds and the gas in the interior cavity fluidly communicates across the inwardly-protruding bonds;

wherein the inwardly-protruding bonds include straight transverse bonds, each of the straight transverse bonds extending from the peripheral flange at a medial side of the bladder to the peripheral flange at a lateral side of the bladder without intersecting any of the other straight transverse bonds;

wherein the inwardly-protruding bonds further include two longitudinal bonds extending from the peripheral flange at the forward end of the bladder to the peripheral flange at the rear end of the bladder, the two longitudinal bonds intersecting each of the straight transverse bonds without intersecting one another;

wherein the straight transverse bonds include forward transverse bonds spaced apart from one another and a rear transverse bond disposed rearward of the forward transverse bonds; and wherein the inwardly-protruding bonds further include diagonal bonds extending rearward and transversely outward from intersections of a rearmost one of the forward transverse bonds and the longitudinal bonds to the peripheral flange.

17. The article of footwear of claim 16, wherein the inwardly-protruding bonds further include additional diagonal bonds extending forward and transversely outward from intersections of the rear transverse bond and the longitudinal bonds to the peripheral flange.

18. The article of footwear of claim 17, wherein the diagonal bonds meet the additional diagonal bonds at the peripheral flange.

19. The article of footwear of claim 17, wherein the inwardly-protruding bonds further include a rearmost diagonal bond extending rearward from one of the intersections of the rear transverse bond and one of the longitudinal bonds to the peripheral flange.

\* \* \* \* \*